US011866028B2

(12) United States Patent
Or-Bach et al.

(10) Patent No.: US 11,866,028 B2
(45) Date of Patent: *Jan. 9, 2024

(54) EFFICIENT ELECTRICAL PASSENGER CAR WITH MOTOR CONTROL

(71) Applicant: Or-Ment LLC, San Jose, CA (US)

(72) Inventors: Zvi Or-Bach, Haifa (IL); Brian Cronquist, Klamath Falls, OR (US)

(73) Assignee: Monolithic 3D Inc., Klamath Falls, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/208,259

(22) Filed: Jun. 10, 2023

(65) Prior Publication Data

US 2023/0311840 A1   Oct. 5, 2023

Related U.S. Application Data

(63) Continuation of application No. 17/879,763, filed on Aug. 2, 2022, now Pat. No. 11,738,736, which is a continuation of application No. 17/585,537, filed on Jan. 26, 2022, now Pat. No. 11,447,119, which is a continuation of application No. 17/497,790, filed on Oct. 8, 2021, now Pat. No. 11,267,448, which is a continuation of application No. 17/334,738, filed on May 30, 2021, now Pat. No. 11,167,742, which is a continuation of application No. 17/019,342, filed on Sep. 13, 2020, now Pat. No. 11,052,897, which is a
(Continued)

(51) Int. Cl.
*B60W 10/08* (2006.01)
*B60W 10/20* (2006.01)
*B60W 10/04* (2006.01)

(52) U.S. Cl.
CPC ............ *B60W 10/08* (2013.01); *B60W 10/04* (2013.01); *B60W 10/20* (2013.01); *B60W 2710/083* (2013.01); *B60W 2720/28* (2013.01); *B60W 2720/403* (2013.01)

(58) Field of Classification Search
CPC ...... B60W 10/08; B60W 10/04; B60W 10/20; B60W 2720/28; B60W 2720/403; B60W 2710/083
See application file for complete search history.

(56) References Cited

U.S. PATENT DOCUMENTS 11,267,448 B2 * 3/2022 Or-Bach ............... B60W 10/08
11,447,119 B2 * 9/2022 Or-Bach ............... B60W 10/20

* cited by examiner

*Primary Examiner* — Jason D Shanske
*Assistant Examiner* — James J Triggs
(74) *Attorney, Agent, or Firm* — Patent PC PowerPatent; Bao Tran

(57) ABSTRACT

An electrical passenger car, the electrical passenger car including: at least two electrically driven motors; motor control electronics, where the motor control electronics are connected to the at least two electrically driven motors; wheels, where the wheels are connected to the at least two electrically driven motors; and sensors, where the sensors are connected to at least the motor control electronics, where the wheels include a first wheel and a second wheel, where the second wheel has a radius at least 7% greater than a radius of the first wheel, where the motor control electronics control the at least two electrically driven motors to provide a greater torque to the first wheel than to the second wheel, and where the electrical passenger car is designed to operate efficiently on a paved road.

20 Claims, 17 Drawing Sheets

Related U.S. Application Data continuation-in-part of application No. 16/794,410, filed on Feb. 19, 2020, now Pat. No. 10,843,679, which is a continuation-in-part of application No. 16/596,515, filed on Oct. 8, 2019, now Pat. No. 10,604,141, which is a continuation-in-part of application No. 16/566,861, filed on Sep. 10, 2019, now Pat. No. 10,479,177, which is a continuation-in-part of application No. 16/149,011, filed on Oct. 1, 2018, now Pat. No. 10,449,802, which is a continuation-in-part of application No. 15/582,778, filed on May 1, 2017, now Pat. No. 10,173,464.

(60) Provisional application No. 62/846,722, filed on May 12, 2019, provisional application No. 62/349,045, filed on Jun. 12, 2016.

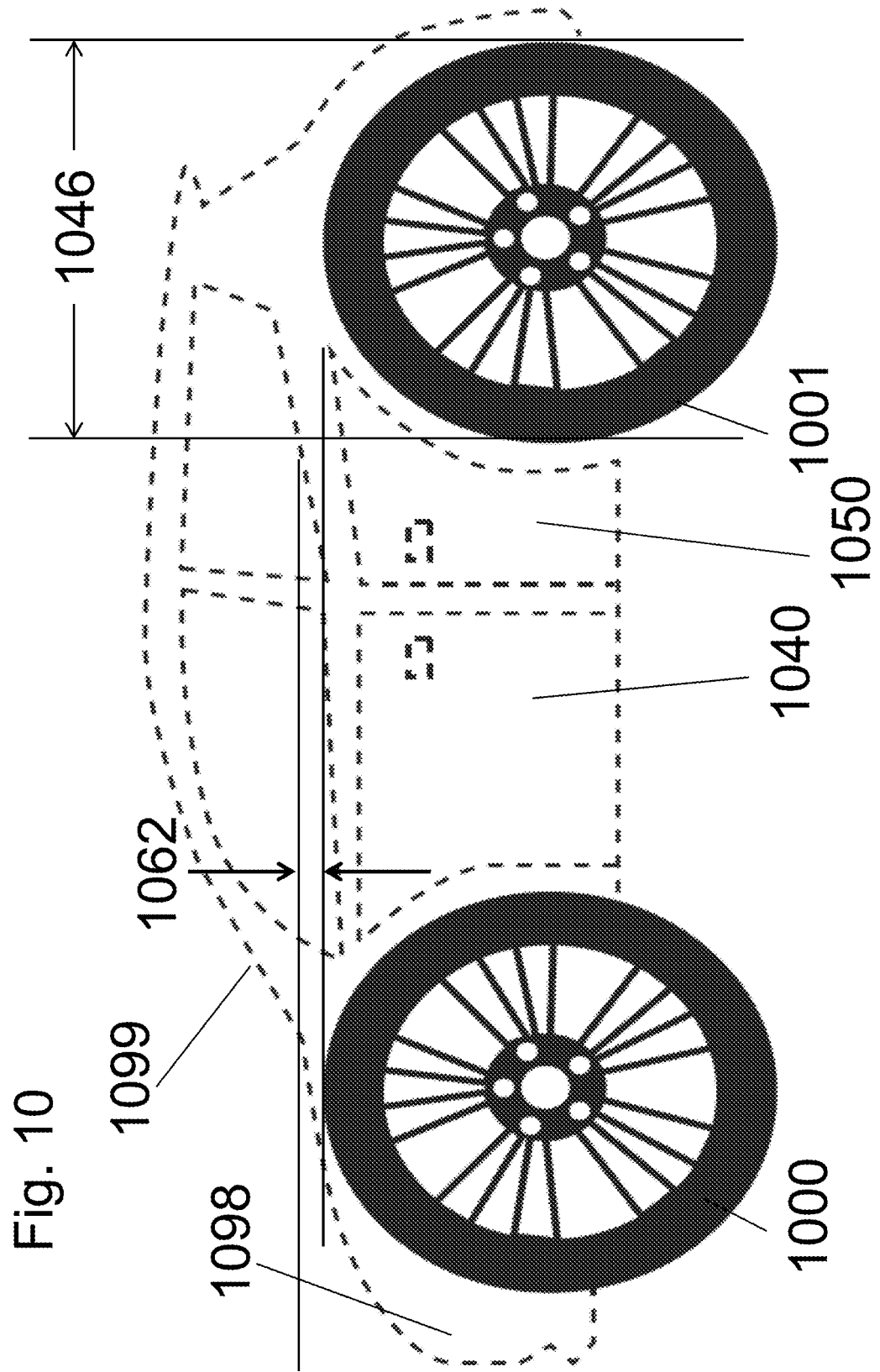

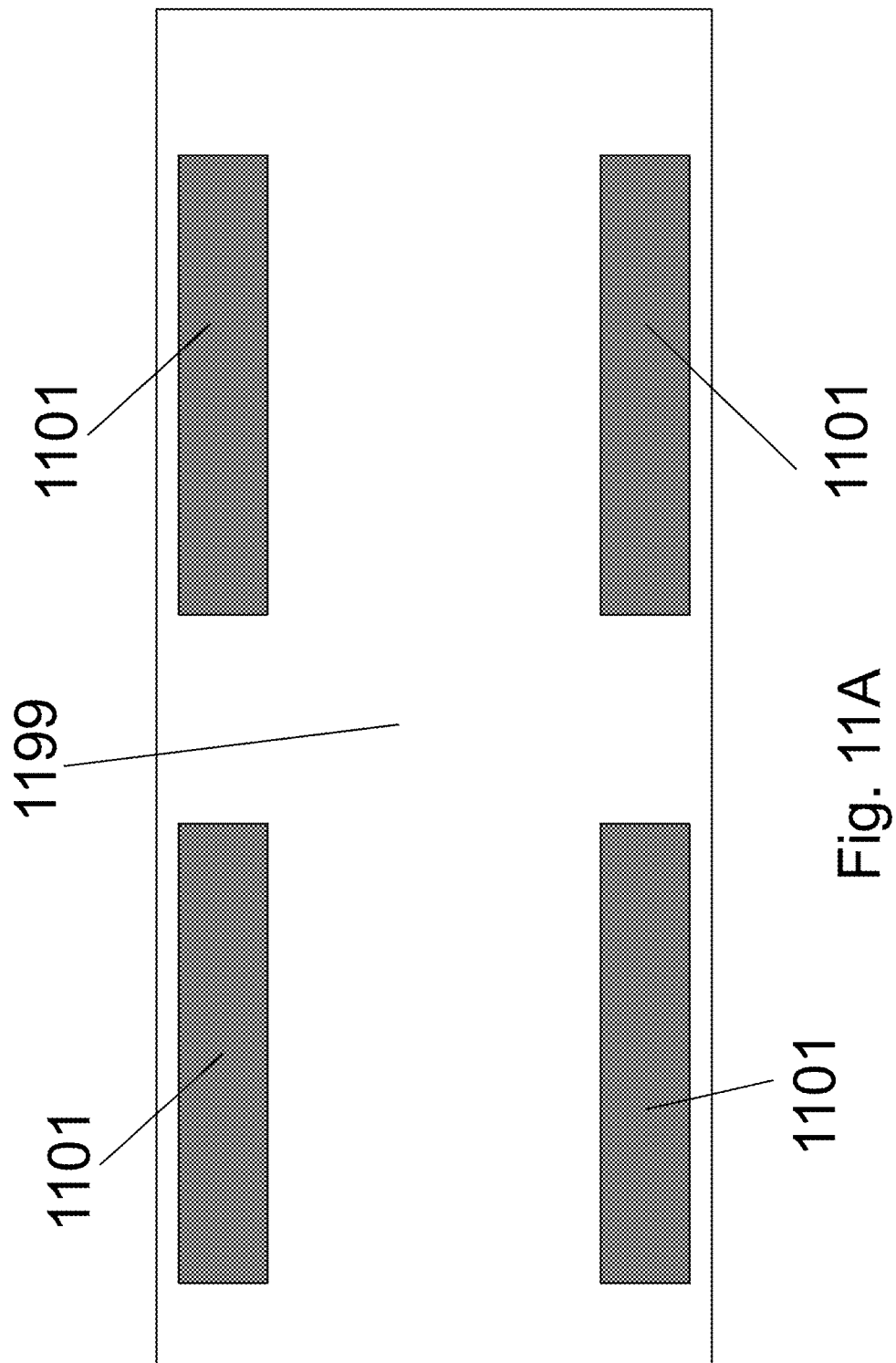

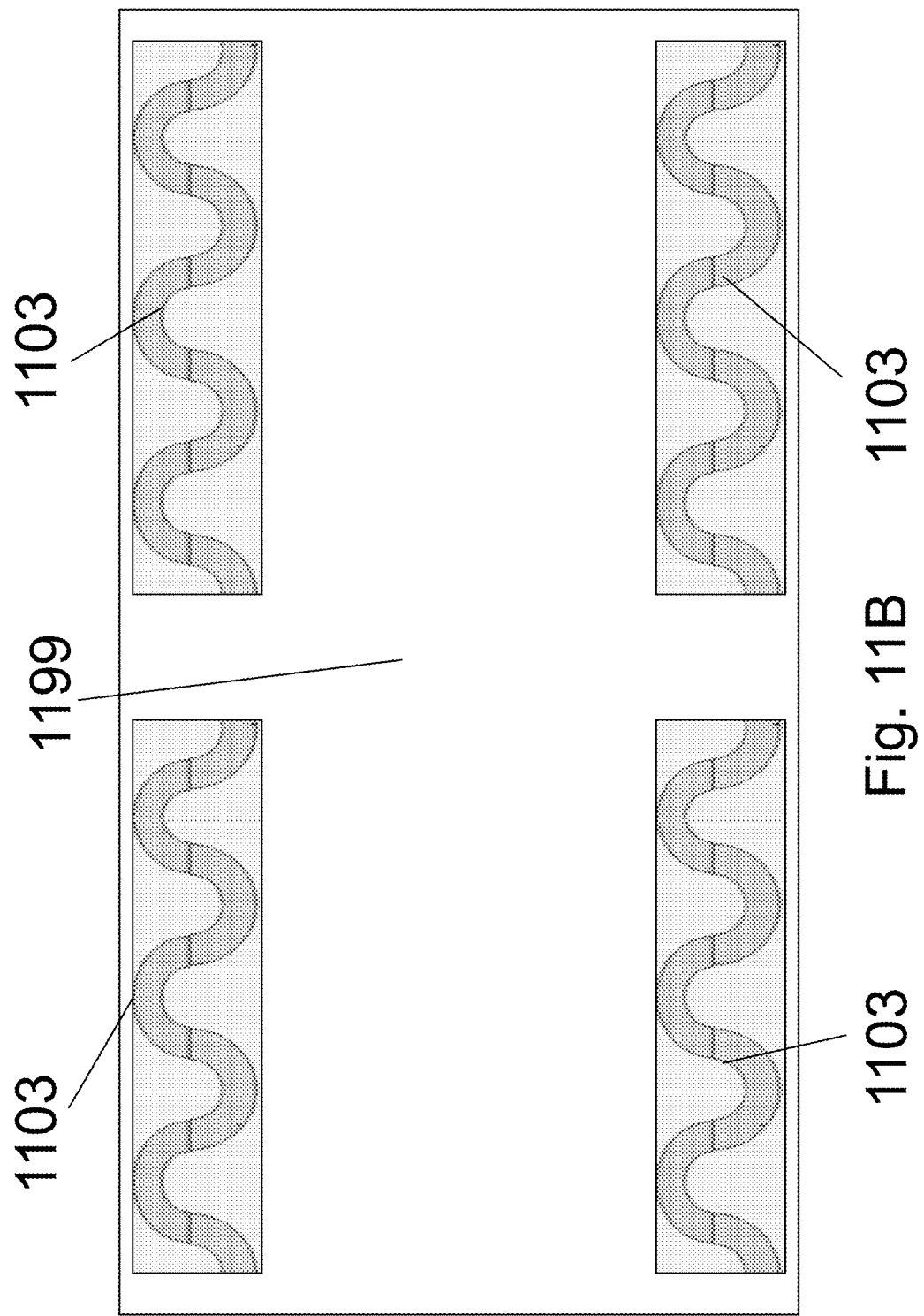

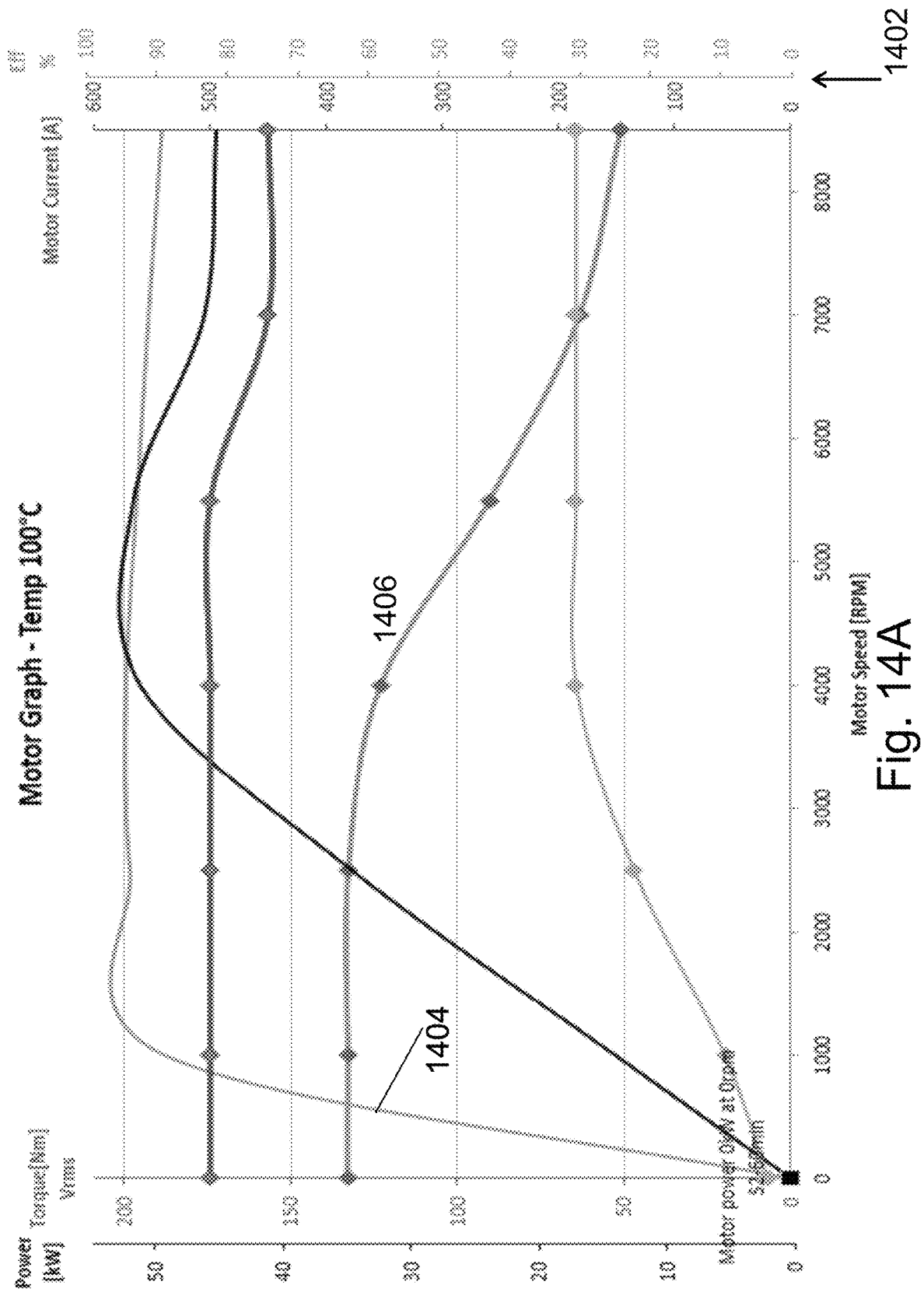

Motor Table

| Wkp | Rpm | Nm | Mot Eff % | Vrms | Pm (kW) |
|---|---|---|---|---|---|
| 1 | 0 | 132.7 | 0.0 | 6.9 | 0.0 |
| 2 | 1000 | 132.7 | 89.9 | 19.6 | 13.9 |
| 3 | 2500 | 132.5 | 94.9 | 46.9 | 34.7 |
| 4 | 4000 | 122.6 | 95.5 | 64.5 | 51.3 |
| 5 | 5500 | 90.1 | 93.8 | 64.5 | 51.9 |
| 6 | 7000 | 63.2 | 92.1 | 64.5 | 46.3 |
| 7 | 8500 | 51.0 | 90.3 | 64.5 | 45.3 |

Fig. 14B

EFFICIENT ELECTRICAL PASSENGER CAR WITH MOTOR CONTROL

This application is a continuation-in-part of U.S. patent application Ser. No. 17/879,763, filed on Aug. 2, 2022, which is a continuation of U.S. patent application Ser. No. 17/585,537, filed on Jan. 26, 2022, now U.S. Pat. No. 11,447,119 issued on Sep. 20, 2022, which is a continuation of U.S. patent application Ser. No. 17/497,790, filed on Oct. 8, 2021, now U.S. Pat. No. 11,267,448 issued on Mar. 8, 2022, which is a continuation of U.S. patent application Ser. No. 17/334,738, filed on May 30, 2021, now U.S. Pat. No. 11,167,742 issued on Nov. 9, 2021, which is a continuation of U.S. patent application Ser. No. 17/019,342, filed on Sep. 13, 2020, now U.S. Pat. No. 11,052,897 issued on Jul. 6, 2021, which is a continuation of U.S. patent application Ser. No. 16/794,410, filed on Feb. 19, 2020, now U.S. Pat. No. 10,843,679 issued on Nov. 24, 2020, which is a continuation-in-part of U.S. patent application Ser. No. 16/596,515, filed on Oct. 8, 2019, now U.S. Pat. No. 10,604,141 issued on Mar. 31, 2020, which is a continuation-in-part of U.S. patent application Ser. No. 16/566,861, filed on Sep. 10, 2019, now U.S. Pat. No. 10,479,177 issued on Nov. 19, 2019, which is a continuation-in-part of U.S. patent application Ser. No. 16/149,011, filed on Oct. 1, 2018, now U.S. Pat. No. 10,449,804 issued on Oct. 22, 2019, which is a continuation-in-part of U.S. patent application Ser. No. 15/582,778, filed on May 1, 2017, now U.S. Pat. No. 10,173,464 issued on Jan. 8, 2019, which claims the benefit of U.S. provisional Patent Application 62/349,045, filed on Jun. 12, 2016. U.S. patent application Ser. No. 16/566,861, filed on Sep. 10, 2019, also claims the benefit of U.S. provisional Patent Application 62/846,722, filed on May 12, 2019. In addition, U.S. patent application Ser. No. 17/879,763 filed on Aug. 2, 2022. All of the above, each in their entirety, are incorporated herein by reference.

BACKGROUND OF THE INVENTION

1. Field of Invention

This application relates to the general field of automotive design, function and ornamentation.

2. Discussion of Background Art

Automotive designs have included wheels for many years with little regard for fuel efficiency. However, as the global oil resources become consumed, and political factors continue to make gasoline pricing high, there is a need for a more efficient automobile. There is also the need for a more fuel efficient design of the wheel and sometimes of associated components.

SUMMARY

The invention may be directed to automotive wheel design, generally for passenger cars.

In one aspect, an electrical passenger car, the electrical passenger car comprising: an electrically driven motor; differential speed control; and wheels, wherein said wheels comprise a first front wheel, a second front wheel, a first back wheel, and a second back wheel, wherein at least one of said wheels has a radius larger than 80 cm, wherein said differential speed control comprises an ability to have a turning speed of said first front wheel greater than a turning speed of said second front wheel, and wherein said electrical passenger car is designed to travel for a greater distance for the same axial to wheel friction energy loss than a similar electrical passenger car having wheels of a smaller radius.

In another aspect, an electrical passenger car, the electrical passenger car comprising: an electrically driven motor; differential speed control; and wheels, wherein said wheels comprise a first front wheel, a second front wheel, a first back wheel, and a second back wheel, wherein said first back wheel radius is at least 20% greater than said first front wheel radius, wherein said differential speed control comprises an ability to have a turning speed of said first front wheel greater than a turning speed of said second front wheel, and wherein said electrical passenger car is designed to travel for a greater distance for the same axial to wheel friction energy loss than a similar electrical passenger car having wheels of a smaller radius.

In another aspect, an electrical passenger car, the electrical passenger car comprising: an electrically driven motor; a differential speed control; a center of gravity; and wheels, wherein said wheels comprise a first front wheel, a second front wheel, a first back wheel, and a second back wheel, wherein a distance from said center of gravity to a road surface is 10% longer or shorter than a radius of said first back wheel, wherein said differential speed control comprises an ability to have a turning speed of said first front wheel greater than a turning speed of said second front wheel, and wherein said electrical passenger car is designed to travel for a greater distance for the same axial to wheel friction energy loss than a similar electrical passenger car having wheels of a smaller radius In another aspect, an electrical passenger car, the electrical passenger car comprising: an electrically driven motor; and wheels, wherein said wheels comprise a first wheel, a second wheel, a third wheel, and a fourth wheel, wherein said first wheel and said second wheel have a radius 20 percent larger than said third wheel and said fourth wheel, wherein said electrical passenger car comprises a total weight, wherein said electrical passenger car comprises a center of gravity designed so that greater than 50% of said total weight will be over said first wheel and said second wheel, wherein said electrical passenger car is designed to travel for a greater distance for the same axial to wheel friction energy loss than a similar electrical passenger car having wheels of a smaller radius, and wherein said second wheel width is equal to or less than said third wheel width.

In another aspect, An electrical passenger car, the electrical passenger car comprising: an electrically driven motor; and wheels, wherein said wheels comprise a first wheel, a second wheel, a third wheel, and a fourth wheel, wherein said first wheel and said second wheel have a radius 20 percent larger than said third wheel and said fourth wheel, wherein said electrical passenger car comprises a total weight, wherein said electrical passenger car comprises a center of gravity designed so that greater than 50% of said total weight will be over said first wheel and said second wheel, wherein said electrical passenger car is designed to travel for a greater distance for the same axial to wheel friction energy loss than a similar electrical passenger car having wheels of a smaller radius, wherein said center of gravity has a height from a road, and wherein said height is equivalent in length to a radius of said second wheel.

In another aspect, an electrical passenger car, the electrical passenger car comprising: an electrically driven motor; wheels, wherein said wheels comprise a first wheel, a second wheel, a third wheel, and a fourth wheel, wherein said first wheel and said second wheel have a radius 20 percent larger than said third wheel and said fourth wheel, wherein said electrical passenger car comprises a total weight, wherein said electrical passenger car comprises a center of gravity designed so that greater than 50% of said total weight will be over said first wheel and said second wheel, and wherein said electrical passenger car is designed to travel for a greater distance for the same axial to wheel friction energy loss than a similar electrical passenger car having wheels of a smaller radius; and electronic traction control.

In another aspect, an electrical family car, comprising: an electrically driven motor; and wheels with a radius larger than 90 cm, wherein said car comprises at least one hybrid driving system.

In another aspect, an electrical family car, comprising: an electrically driven motor; and wheels with a radius larger than 90 cm, wherein said wheels comprise a first wheel, a second wheel, a third wheel, and a fourth wheel, and wherein said first wheel and said second wheel have a radius 20 percent larger than said third wheel and said fourth wheel In another aspect, an electrical family car, comprising: an electrically driven motor; and wheels with a radius larger than 90 cm, wherein at least one of said wheels has a radius that is at least three times larger than its width.

In another aspect, an electrical family car, comprising: an electrically driven motor; wheels; and electrical steering, wherein said wheels comprise a first wheel and a second wheel, and wherein said electrical steering comprises independently controlling a first speed of said first wheel and independently controlling a second speed of said second wheel.

In another aspect, an electrical family car, comprising: an electrically driven motor; wheels; and electrical steering, wherein said wheels comprise a first wheel and a second wheel, and wherein said electrical steering comprises independently controlling a first speed of said first wheel and independently controlling a second speed of said second wheel, wherein at least one of said wheels has a radius larger than 90 cm.

In another aspect, an electrical family car, comprising: an electrically driven motor; wheels; and electrical steering, wherein said wheels comprise a first wheel and a second wheel, and wherein said electrical steering comprises independently controlling a first speed of said first wheel and independently controlling a second speed of said second wheel, wherein at least one of said wheels has a wave shape profile.

In another aspect, an electrical family car, comprising: an electrically driven motor; wheels; and electrical steering, wherein said wheels comprise a first wheel and a second wheel, and wherein said electrical steering comprises independently controlling a first speed of said first wheel and independently controlling a second speed of said second wheel, wherein said car comprises at least one hybrid driving system.

In another aspect, an electrical family car, comprising: an electrically driven motor; wheels; and electrical steering, wherein said wheels comprise a first wheel and a second wheel, and wherein said electrical steering comprises independently controlling a first speed of said first wheel and independently controlling a second speed of said second wheel, wherein said wheels comprise a first wheel, a second wheel, a third wheel, and a fourth wheel, and wherein said first wheel and said second wheel have a radius 20 percent larger than said third wheel and said fourth wheel.

In another aspect, an electrical family car, comprising: an electrically driven motor; wheels; and electrical steering, wherein said wheels comprise a first wheel and a second wheel, and wherein said electrical steering comprises independently controlling a first speed of said first wheel and independently controlling a second speed of said second wheel, wherein at least one of said wheels has a radius that is at least three times larger than its width.

In another aspect, an electrical family car, comprising: an electrically driven motor; wheels, wherein at least one of said wheels has a wave shape profile.

In another aspect, an electrical family car, comprising: an electrically driven motor; wheels, wherein at least one of said wheels has a wave shape profile, wherein at least one of said wheels has a radius larger than 90 cm.

In another aspect, an electrical family car, comprising: an electrically driven motor; wheels, wherein at least one of said wheels has a wave shape profile, electrical steering, wherein said wheels comprise a first wheel and a second wheel, and wherein said electrical steering comprises independently controlling a first speed of said first wheel and independently controlling a second speed of said second wheel.

In another aspect, an electrical family car, comprising: an electrically driven motor; wheels, wherein at least one of said wheels has a wave shape profile, wherein said car comprises at least one hybrid driving system.

In another aspect, an electrical family car, comprising: an electrically driven motor; wheels, wherein at least one of said wheels has a wave shape profile, wherein said wheels comprise a first wheel, a second wheel, a third wheel, and a fourth wheel, and wherein said first wheel and said second wheel have a radius 20 percent larger than said third wheel and said fourth wheel.

In another aspect, an electrical family car, comprising: an electrically driven motor; wheels, wherein at least one of said wheels has a wave shape profile, wherein at least one of said wheels has a radius that is at least three times greater than its width.

In another aspect, an electrical passenger car, the electrical passenger car comprising: at least two electrically driven motors; speed control electronics; and wheels, wherein said wheels comprise a first front wheel, a second front wheel, a first back wheel, and a second back wheel, wherein said first back wheel radius is at least 20% greater than said first front wheel radius, wherein said speed control electronics control said at least two electrically driven motors to provide a greater torque to said first front wheel than to said first back wheel, and wherein said electrical passenger car is designed to travel for a greater distance for the same axial to wheel friction energy loss than a similar electrical passenger car having wheels of a smaller radius.

In another aspect, an electrical passenger car, the electrical passenger car comprising: at least two electrically driven motors; speed control electronics; and wheels, wherein said wheels comprise a first front wheel, a second front wheel, a first back wheel, and a second back wheel, wherein said first back wheel radius is at least 20% greater than said first front wheel radius, wherein said speed control electronics could be controlled to provide much greater braking and recharging to said back wheel than to said front wheel, and wherein said electrical passenger car is designed to travel for a greater distance for the same axial to wheel friction energy loss than a similar electrical passenger car having wheels of a smaller radius.

In another aspect, an electrical passenger car, the electrical passenger car comprising: at least two electrically driven motors; speed control electronics; and wheels, wherein said wheels comprise a first front wheel, a second front wheel, a first back wheel, and a second back wheel, wherein said first back wheel radius is at least 20% greater than said first front wheel radius, wherein said speed control electronics could be controlled to provide a much greater braking and recharging to said back wheel than to said front wheel, and wherein said speed control electronics control said at least two electrically driven motors to provide a greater torque to said back wheel than to said front wheel.

In another aspect, an electrical passenger car, the electrical passenger car comprising: at least two electrically driven motors; speed control electronics; and wheels, wherein said wheels comprise a front wheel and a back wheel, wherein said back wheel radius is at least 20% greater than said front wheel radius, wherein said speed control electronics control said at least two electrically driven motors to provide a greater torque to said front wheel than to said back wheel, and wherein said speed control electronics control said at least two electrically driven motors to provide a greater torque to said back wheel than to said front wheel.

In another aspect, an electrical passenger car, the electrical passenger car comprising: at least two electrically driven motors; speed control electronics; and wheels, wherein said wheels comprise a front wheel and a back wheel, wherein said back wheel radius is at least 20% greater than said front wheel radius, and wherein said speed control electronics could be controlled to provide greater braking and recharging to said back wheel than to said front wheel.

In another aspect, an electrical passenger car, the electrical passenger car comprising: at least two electrically driven motors; speed control electronics; and wheels, wherein said wheels comprise a front wheel and a back wheel, wherein said back wheel radius is at least 20% smaller than said front wheel radius, wherein said speed control electronics control said at least two electrically driven motors to provide a greater torque to said front wheel than to said back wheel, and wherein said speed control electronics control said at least two electrically driven motors to provide a greater torque to said back wheel than to said front wheel.

In another aspect, an electrical passenger car, the electrical passenger car comprising: at least two electrically driven motors; motor control electronics; sensors; and wheels, wherein said wheels comprise a first front wheel and a first back wheel, wherein said first back wheel has a radius at least 20% greater than a radius of said first front wheel, and wherein during acceleration of said electrical passenger car, said motor control electronics receive signals from said sensors and provide traction control delivering more power to one of said at least two electrically driven motors accordingly.

In another aspect, an electrical passenger car, the electrical passenger car comprising: at least two electrically driven motors; motor control electronics; sensors; and wheels, wherein said wheels comprise a first front wheel and a first back wheel, wherein said first back wheel radius is at least 20% greater than said first front wheel radius, and wherein during acceleration of said electrical passenger car, said motor control electronics receive signals from said sensors indicating skidding of at least one wheel, and wherein said motor control electronics send signals so to reduce torque provided to at least one of said at least two electrically driven motors.

In another aspect, an electrical passenger car, the electrical passenger car comprising: at least two electrically driven motors; motor control electronics; and wheels, wherein said wheels comprise a first front wheel and a first back wheel, wherein said first back wheel radius is at least 20% smaller than said first front wheel radius, wherein said motor control electronics are controlled to provide greater braking and recharging to/from said first back wheel than to/from said first front wheel.

In another aspect, an electrical passenger car, the electrical passenger car including: at least two electrically driven motors; motor control electronics; sensors; and wheels, where the wheels include a first front wheel and a first back wheel, where the first back wheel has a radius at least 15% greater than a radius of the first front wheel, and where the motor control electronics control the at least two electrically driven motors to provide a greater torque to the front wheel than to the back wheel, or where the motor control electronics control the at least two electrically driven motors to provide a greater torque to the back wheel than to the front wheel.

In another aspect, an electrical passenger car, the electrical passenger car including: at least two electrically driven motors; motor control electronics; sensors; and wheels, where the wheels include a first front wheel and a first back wheel, where the first back wheel radius is at least 15% greater than the first front wheel radius, and electrical steering, where the wheels further include a second front wheel, where the electrical steering includes controlling to a first speed of the first front wheel and controlling to a second speed of the second front wheel.

In another aspect, an electrical passenger car, the electrical passenger car including: at least two electrically driven motors; motor control electronics, a center of gravity; and wheels, where the wheels include a first front wheel and a first back wheel, where the first back wheel radius is at least 15% greater than the first front wheel radius, and where a distance from the center of gravity to a road surface is 10% longer or shorter than a radius of the first back wheel.

In another aspect, an electrical passenger car, the electrical passenger car including: at least two electrically driven motors; motor control electronics; sensors; and wheels, where the wheels include a first front wheel and a first back wheel, where the first back wheel has a radius at least 9% greater than a radius of the first front wheel, and where the motor control electronics control the at least two electrically driven motors to provide a greater torque to the front wheel than to the back wheel, or where the motor control electronics control the at least two electrically driven motors to provide a greater torque to the back wheel than to the front wheel.

In another aspect, an electrical passenger car, the electrical passenger car including: at least two electrically driven motors; motor control electronics; sensors; and wheels, where the wheels include a first front wheel and a first back wheel, where the first back wheel radius is at least 9% greater than the first front wheel radius, where during acceleration of the electrical passenger car, the motor control electronics receive signals from the sensors indicating skidding of at least one wheel, and where the motor control electronics send signals so to reduce torque provided to at least one of the at least two electrically driven motors.

In another aspect, an electrical passenger car, the electrical passenger car including: at least two electrically driven motors; motor control electronics; a center of gravity; and wheels, where the wheels include a first front wheel and a first back wheel, where during acceleration of the electrical passenger car, the motor control electronics receive signals from the sensors and provide traction control delivering more power to one of the at least two electrically driven motors accordingly, and where a distance from the center of gravity to a road surface is 10% longer or shorter than a radius of the first back wheel.

In another aspect, an electrical passenger car, the electrical passenger car including: at least two electrically driven motors; motor control electronics; sensors; and wheels, where the wheels include a first wheel and a second wheel, where the second wheel has a radius at least 7% greater than a radius of the first wheel, and where the motor control electronics control the at least two electrically driven motors to provide a greater torque to the second wheel than to the first wheel.

In another aspect, an electrical passenger car, the electrical passenger car including: at least two electrically driven motors; motor control electronics; sensors; and wheels, where the wheels include a first wheel and a second wheel, where the second wheel has a radius at least 7% greater than a radius of the first wheel, where during an acceleration of the electrical passenger car, the motor control electronics receive signals from the sensors indicating skidding of at least one wheel, and where the motor control electronics send signals so to reduce a torque provided to at least one of the at least two electrically driven motors.

In another aspect, an electrical passenger car, the electrical passenger car including: at least two electrically driven motors; motor control electronics; sensors; and wheels, where the wheels include a first wheel and a second wheel, where the second wheel has a radius at least 7% greater than a radius of the first wheel, and where during an acceleration of the electrical passenger car, the motor control electronics receive signals from the sensors and provide a traction control by delivering more power to one of the at least two electrically driven motors accordingly.

In another aspect, an electrical passenger car, the electrical passenger car including: at least two electrically driven motors; motor control electronics, where the motor control electronics are connected to the at least two electrically driven motors; wheels, where the wheels are connected to the at least two electrically driven motors; and sensors, where the sensors are connected to at least the motor control electronics; where the wheels include a first wheel and a second wheel, where the second wheel has a radius at least 7% greater than a radius of the first wheel, and where the motor control electronics control the at least two electrically driven motors to provide a greater torque to the first wheel than to the second wheel, and where the electrical passenger car is designed to operate efficiently on a paved road.

In another aspect, an electrical passenger car, the electrical passenger car including: at least two electrically driven motors; motor control electronics, where the motor control electronics are connected to the at least two electrically driven motors; wheels, where the wheels are connected to the at least two electrically driven motors; and sensors, where the sensors are connected to at least the motor control electronics, where the wheels include a first wheel and a second wheel, where the second wheel has a radius at least 7% greater than a radius of the first wheel, where the electrical passenger car is designed to operate efficiently on a paved road, where during an acceleration of the electrical passenger car, the motor control electronics receive first signals from the sensors, where the first signals indicate skidding of the first wheel, where the motor control electronics send second signals to at least one of the at least two electrically driven motors, and where the second signals include instructions to reduce torque for the first wheel and increase torque to the second wheel.

In another aspect, an electrical passenger car, the electrical passenger car including: at least one permanent motor and at least one induction motor; motor control electronics, where the motor control electronics are connected to the at least one permanent motor and to the at least one induction motor; wheels, where the wheels are connected to the at least one permanent motor and to the at least one induction motor; and sensors, where the sensors are connected to at least the motor control electronics, where the wheels include a first wheel and a second wheel, where the second wheel has a radius at least 7% greater than a radius of the first wheel, where the motor control electronics control the at least one permanent motor and the at least one induction motor to provide a greater torque to the first wheel than to the second wheel, and where the electrical passenger car is designed to operate efficiently on a paved road.

In general electric cars are known to have far better energy efficiency than internal combustion propelled cars. For electric propelled cars, about 60% of the battery energy is delivered to its wheels as compared to gas driven cars which have about 20% efficiency. Furthermore, for most electric cars, a majority of the braking operation is achieved through generator emf, which results in electrical generation; thus converting the wheel rotation energy back into to electrical energy. Consequently, the axial friction of an electric car ultimately dominates the use of its battery charge. Using a larger wheel (radius/diameter, not width) could provide a greater travel distance for the same axial friction.

BRIEF DESCRIPTION OF THE DRAWINGS

Various embodiments of the invention will be understood and appreciated more fully from the following detailed description, taken in conjunction with the drawings in which:

FIG. 10 is an additional exemplary drawing illustration of a left side view of efficient wheels on a vehicle depicting measures;

FIG. 11A is an exemplary drawing illustration of a bottom view of conventional profile wheels on a vehicle;

FIG. 11B is an exemplary drawing illustration of a bottom view of novel profile wheels on a vehicle;

FIG. 14A is a drawing illustration of a motor (HyPer 9 IS 100V, 750 A AC Motor) graph from NetGain Motors, Inc.; and FIG. 14B is a related table of the motor characteristics of FIG. 14A.

DETAILED DESCRIPTION

Figure 1:
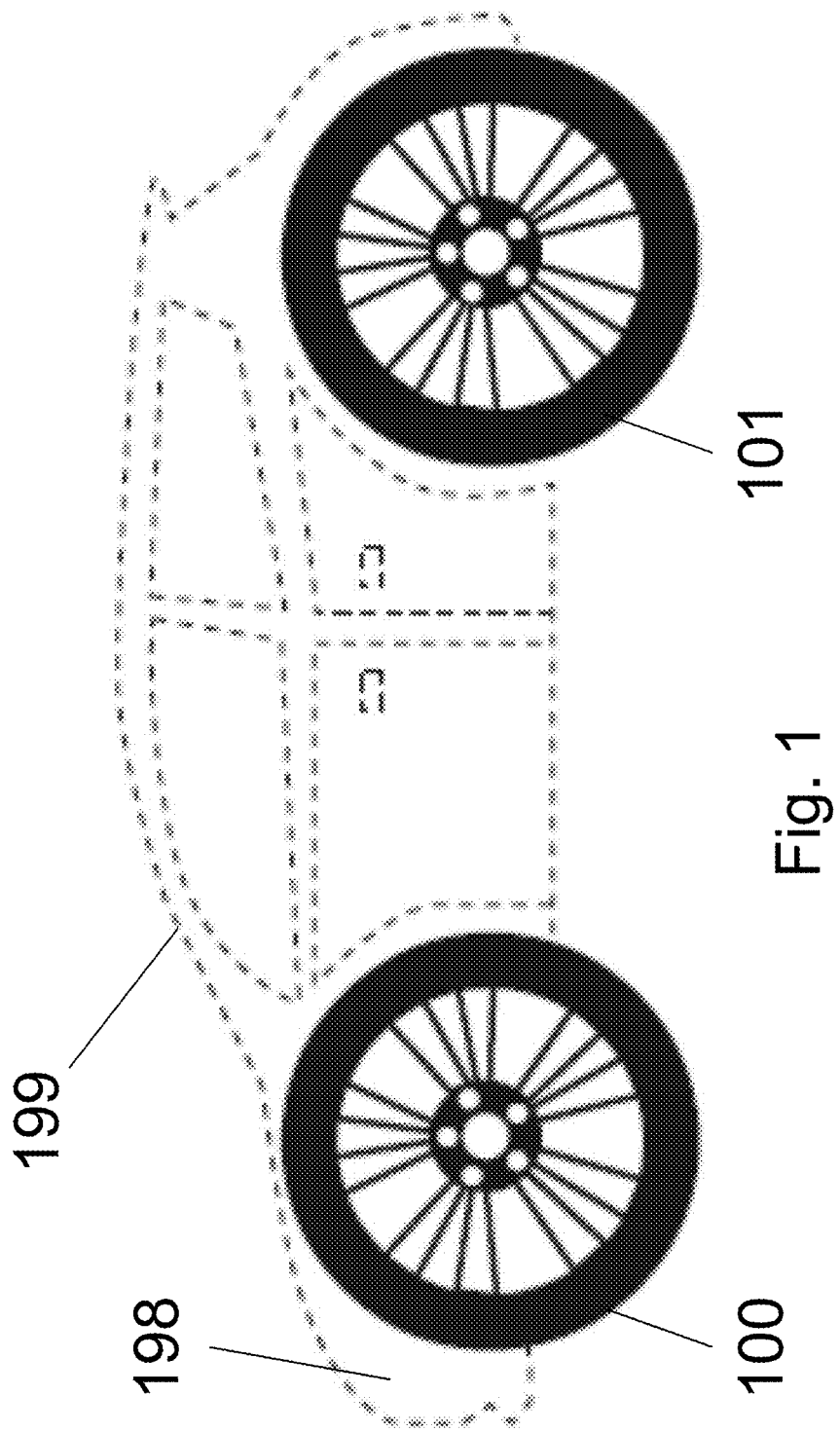
FIG. 1 is an exemplary drawing illustration of a left side view of efficient wheels on a vehicle.

Embodiments of the invention are described herein with reference to the drawing figures. Persons of ordinary skill in the art will appreciate that the description and figures illustrate rather than limit the invention and that in general the figures are not drawn to scale for clarity of presentation. Such skilled persons will also realize that many more embodiments are possible by applying the inventive principles contained herein and that such embodiments fall within the scope of the invention which is not to be limited except by the appended claims.

Currently electric motor driven cars, either as hybrid or full electric vehicles, are becoming popular. In such cars one of the dominating energy losses is directly related to the car axial to wheel friction. The car efficiency could therefore be increased by increasing the car wheel diameter which could yield a larger traveling distance (about πd) for the same axial to wheel friction related energy loss. This is especially applicable for the common passenger car which is designed to operate on paved roads. Accordingly it could be desired to have the car efficient wheel diameter at least about 20% larger than the average wheel diameter of similar sized common passenger cars, or even greater than about 40%, or greater than about 60%, or greater than about 80% or even more than double the size of a common passenger car designed to operate on a paved road, such as, for example, highways or common streets.

A very large wheel diameter could make the design of the car more challenging, for example, for the front wheels which need room for steering. In the following some alternatives are presented to help overcome this challenge. One alternative it to use differential wheel speed as an alternative to mechanical steering. Another alternative is to have regular wheels for the front using conventional mechanical steering and having the large wheels only for the rear wheels. For the equal wheel size to be even more effective, the car could be designed so the rear wheels will carry a bigger portion of the car weight. Preferably 60% of the car weight or 70% or even more than 75% of the car weight. Computer control of the traction, braking and turning may be needed to ensure stability during turns and braking. As well, rear wheel assisted turning may need to be provided.

Many electric motor cars use more than a single motor to drive the car. In many of these vehicles the car steering could leverage the electronic control of the wheel speed. Such speed and wheel controlled steering could assist the use of very large wheels, thus increasing the overall car traveling distance per the same energy use.

Some drawing figures may describe various views of the invention or portions of the invention. These views may have many structures, numerals and labels that may be common between two or more adjacent drawings. In such cases, some labels, numerals and structures used for a certain view's figure may have been described in the previous views' figures.

As illustrated in FIG. 1, a left side view of efficient wheels on a vehicle, may include a front left efficient wheel 100, a rear left efficient wheel 101, and a vehicle 199. Vehicle 199 may also include a vehicle front 198. In this document, the term wheels may include the tire.

Figure 2:
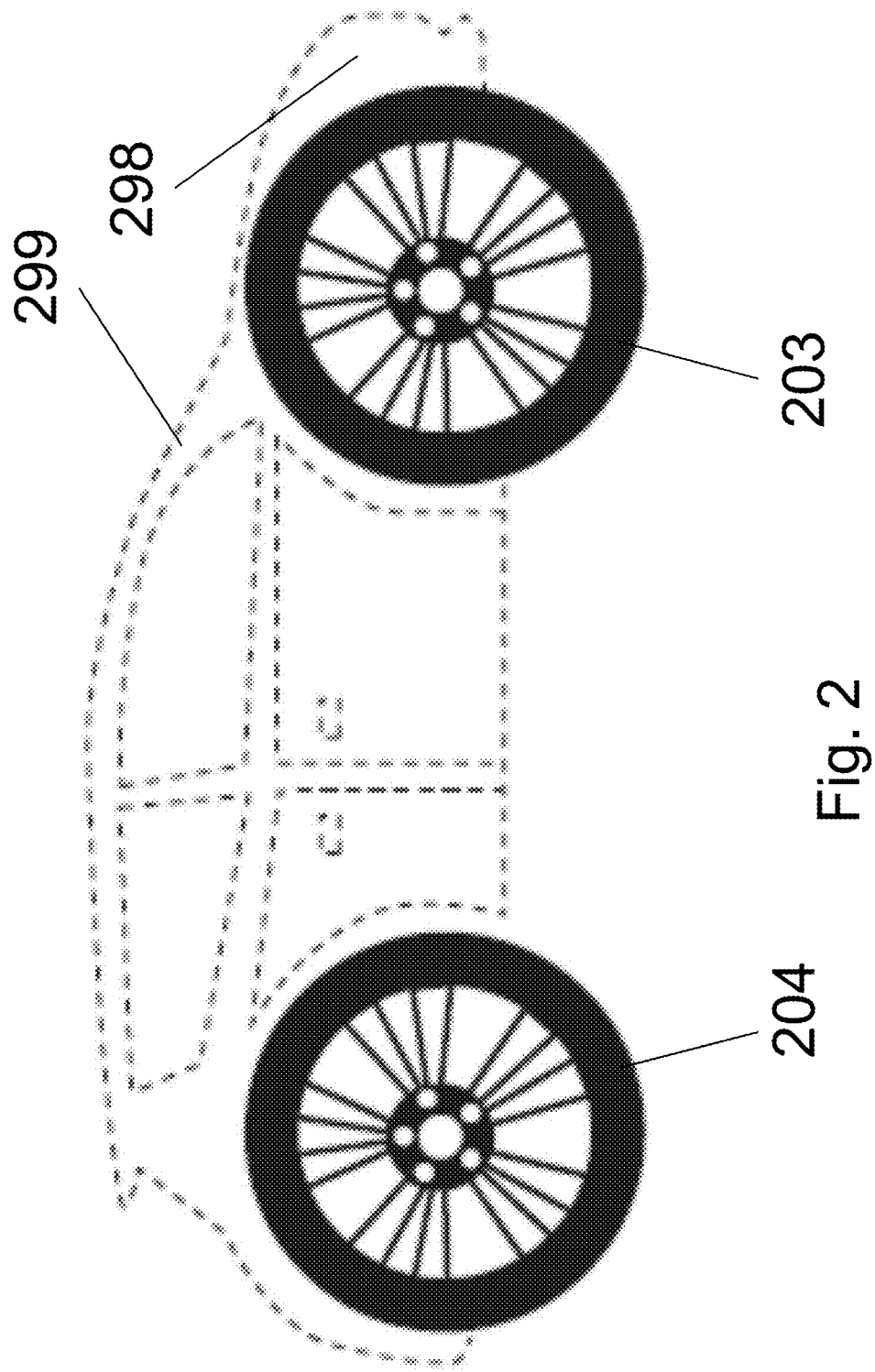
FIG. 2 is an exemplary drawing illustration of a right side view of efficient wheels on a vehicle.

As illustrated in FIG. 2, a right side view of efficient wheels on a vehicle, may include a front right efficient wheel 203, a rear right efficient wheel 204, and a vehicle 299. Vehicle 299 may also include a vehicle front 298.

Figure 3:
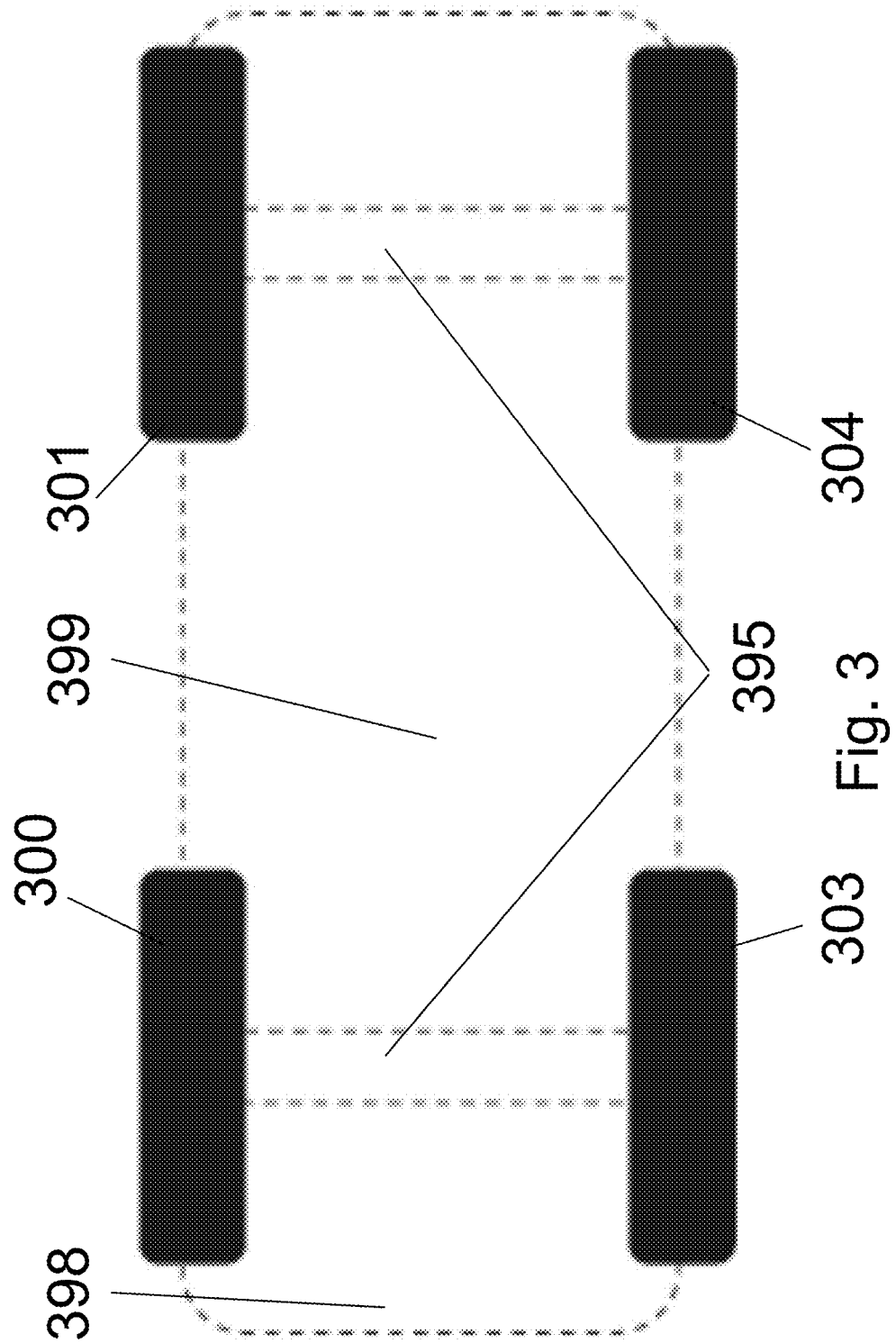
FIG. 3 is an exemplary drawing illustration of a bottom view of efficient wheels on a vehicle.

As illustrated in FIG. 3, a bottom view of efficient wheels on a vehicle, may include a front left efficient wheel 300, a rear left efficient wheel 301, a front right efficient wheel 303, a rear right efficient wheel 304, and a vehicle 399. Vehicle 399 may also include a vehicle front 398 and wheel axles 395. Note, axles may not be necessary when individual wheel motors are utilized, alternative suspension designs may be used.

Figure 4:
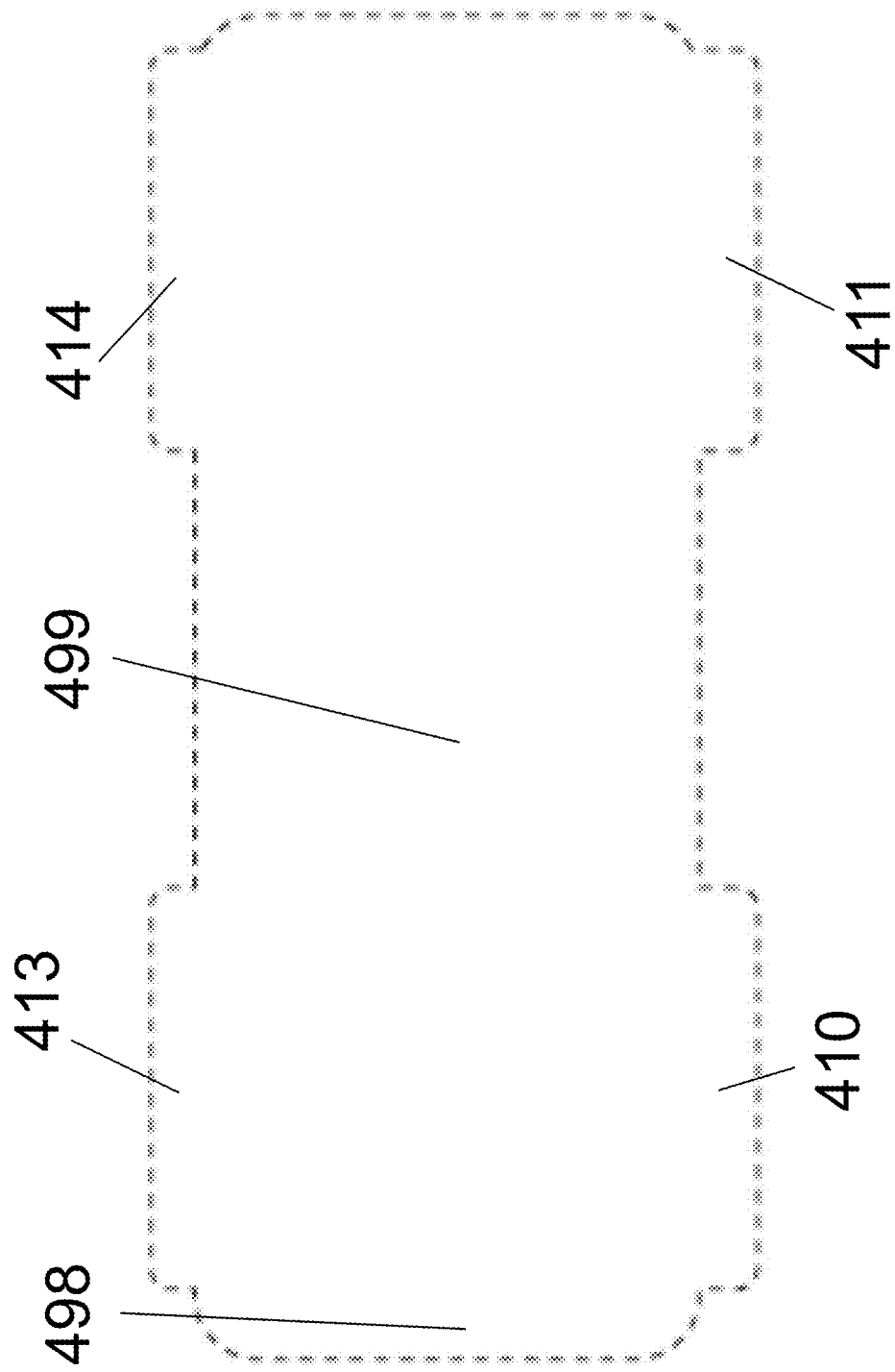
FIG. 4 is an exemplary drawing illustration of a top view of efficient wheels on a vehicle.

As illustrated in FIG. 4, a top view of efficient wheels on vehicle 499, may include a front left fender 410, a rear left fender 411, a front right fender 413, a rear right fender 414. Vehicle 499 may also include a vehicle front 498. Front left fender 410, a rear left fender 411, a front right fender 413, a rear right fender 414 may cover their respective efficient wheels referenced in the Figures herein.

Figure 5:
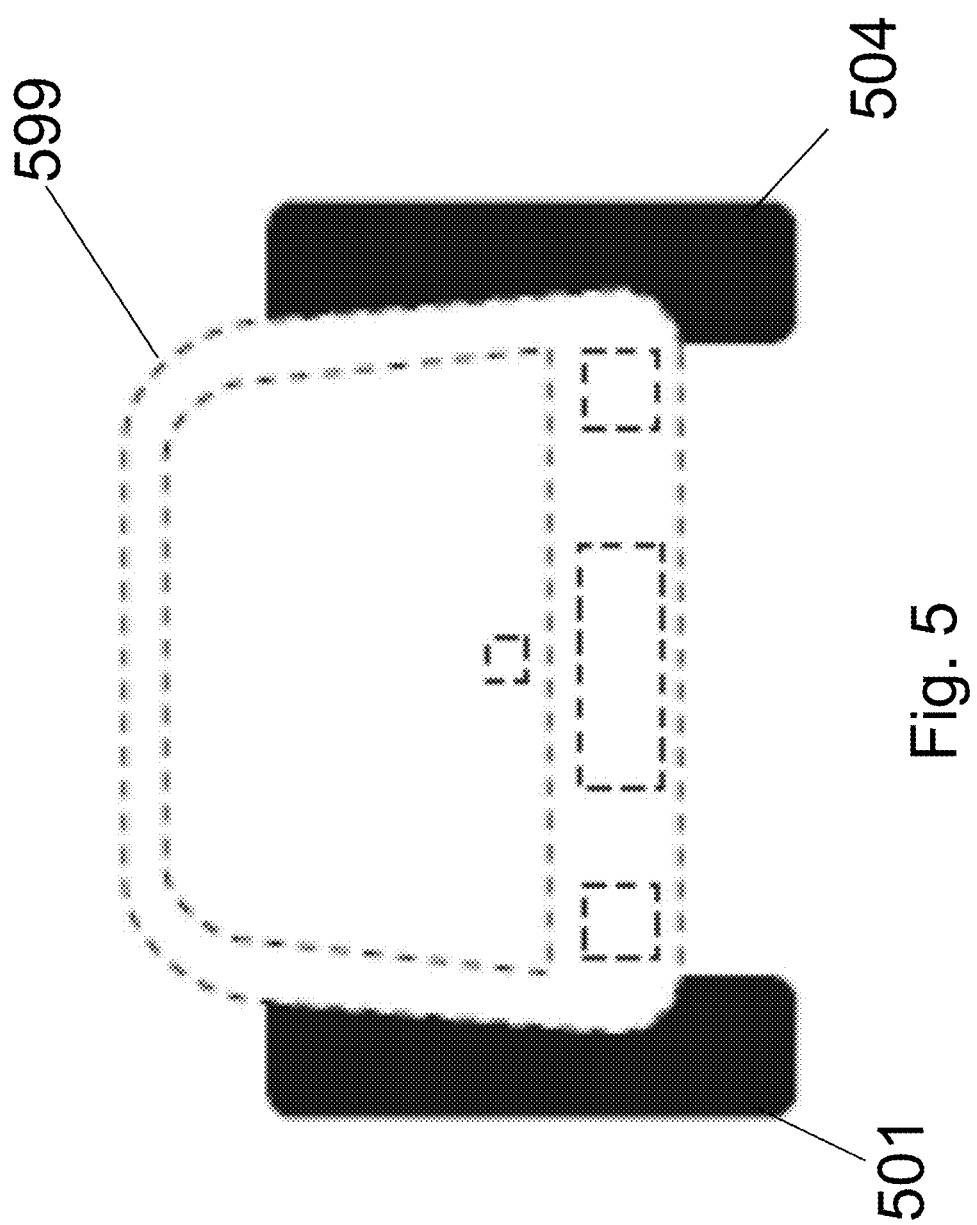
FIG. 5 is an exemplary drawing illustration of a back view of efficient wheels on a vehicle.

As illustrated in FIG. 5, a rear view of efficient wheels on a vehicle, may include a rear left efficient wheel 501, a rear right efficient wheel 504, and a vehicle 599. In this view, fenders or the body design of car 599 may only cover a small portion of the rear left efficient wheel 501 and rear right efficient wheel 504.

Figure 6:
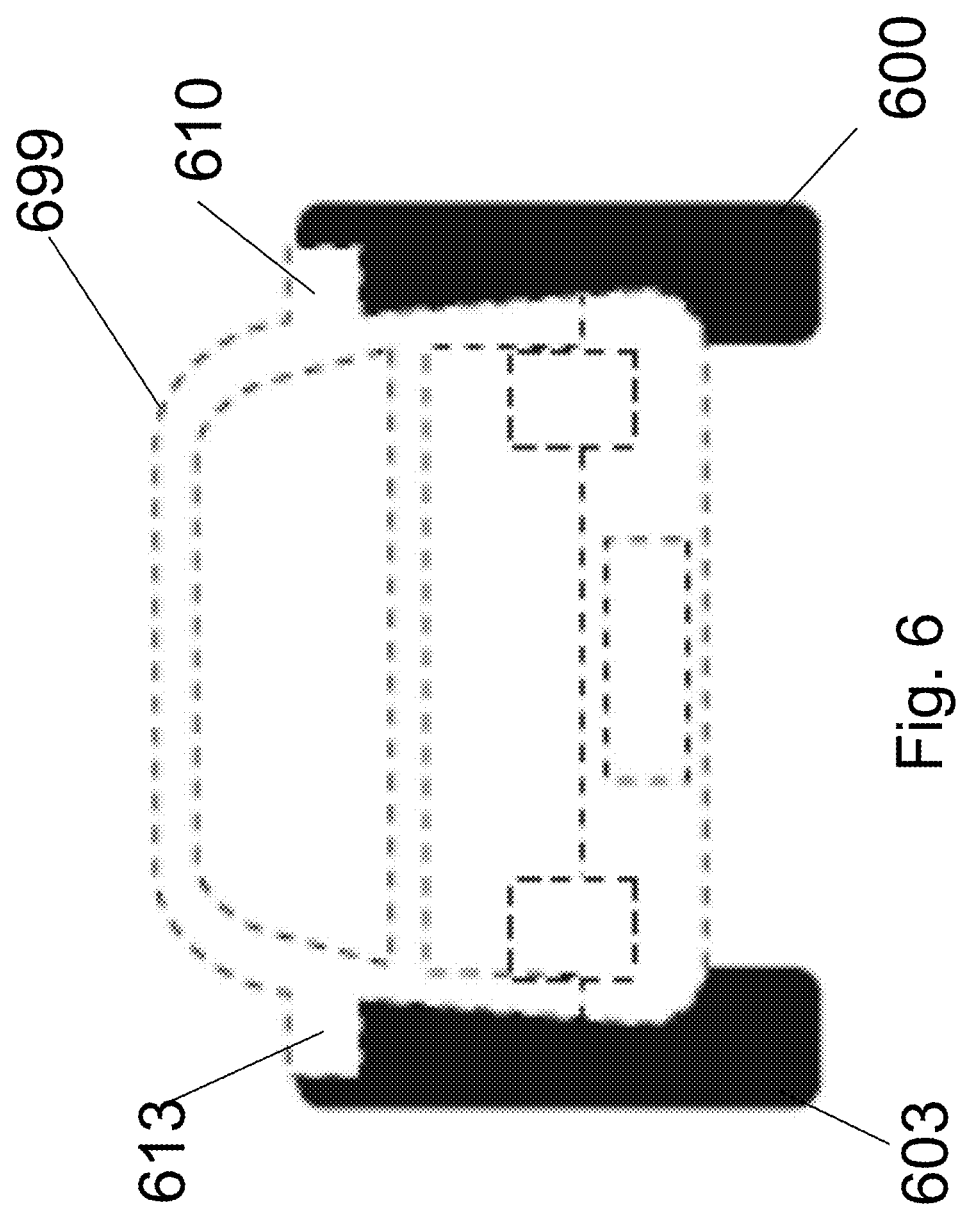
FIG. 6 is an exemplary drawing illustration of a front view of efficient wheels on a vehicle.

As illustrated in FIG. 6, a front view of efficient wheels on a vehicle, may include a front left efficient wheel 601, a front right efficient wheel 603, a front left fender 610, a front right fender 613, and a vehicle 599. In this view, fenders such as front left fender 610 and front right fender 613 of car 599 may cover a portion of the front left efficient wheel 501 and front right efficient wheel 504 respectively. The fenders of the car may also completely cover the efficient wheels of the car.

Figure 7:
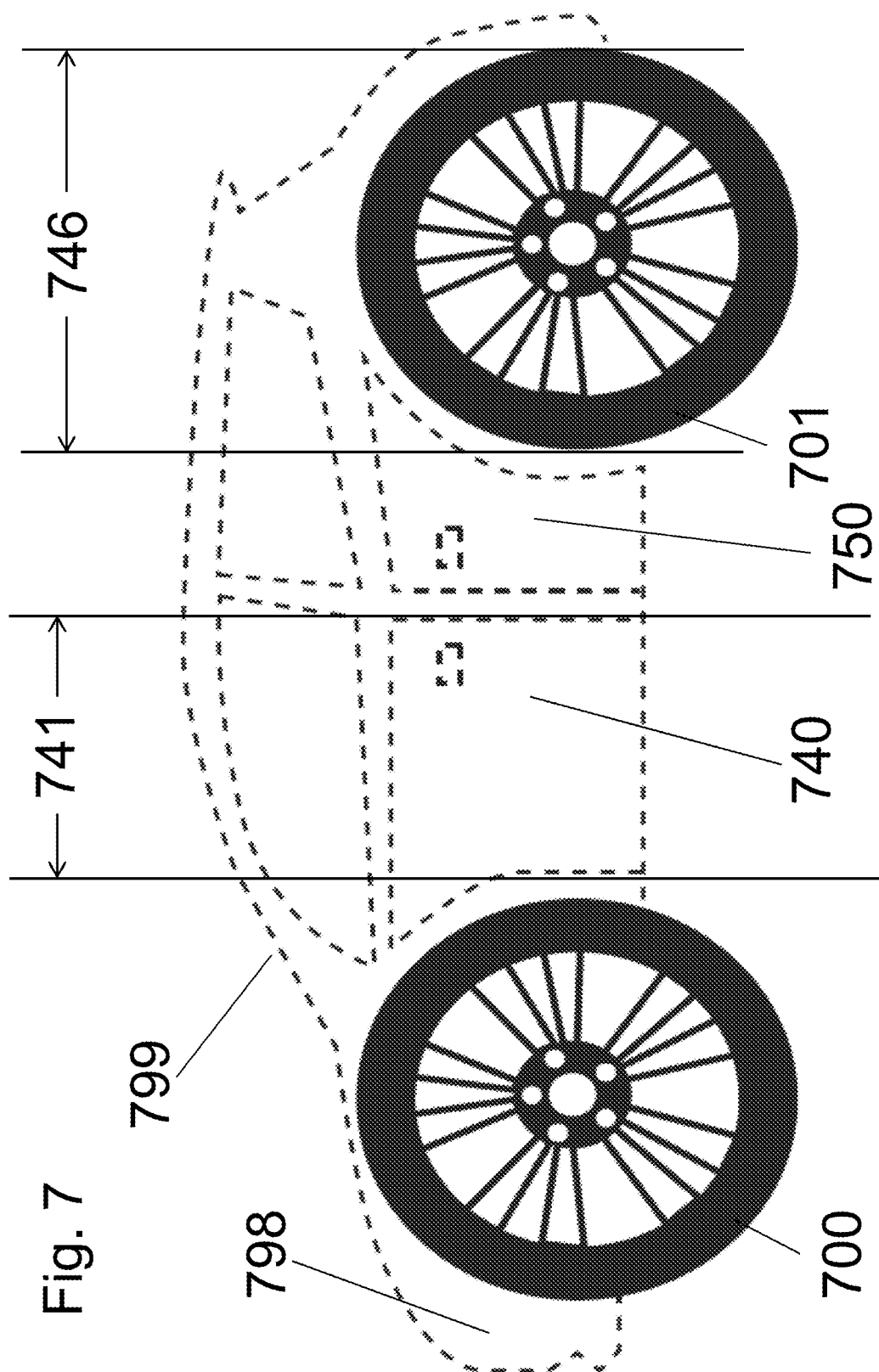
FIG. 7 is an exemplary drawing illustration of a left side view of efficient wheels on a vehicle depicting measures.

As illustrated in FIG. 7, a left side view of efficient wheels on a vehicle, may include a front left efficient wheel 700, a rear left efficient wheel 701, a front passenger door 740, a rear passenger door 750, and a vehicle 799. Vehicle 799 may also include a vehicle front 798. Front passenger door 740 may have front passenger door width 741, which may be defined as the distance from the lock point to the axial door line. Similarly, rear passenger door 750 may have a rear passenger door width, similarly defined (not shown for drawing clarity). Efficient wheels may have a diameter, for example, rear left efficient wheel 701 may have wheel diameter 746. Efficient wheel diameter 746 may be equal to or greater than the length of the larger of the front or rear door side size of a consumer passenger car. For example, efficient wheel diameter 746 may be equal to or greater than front passenger door width 741.

Figure 8:
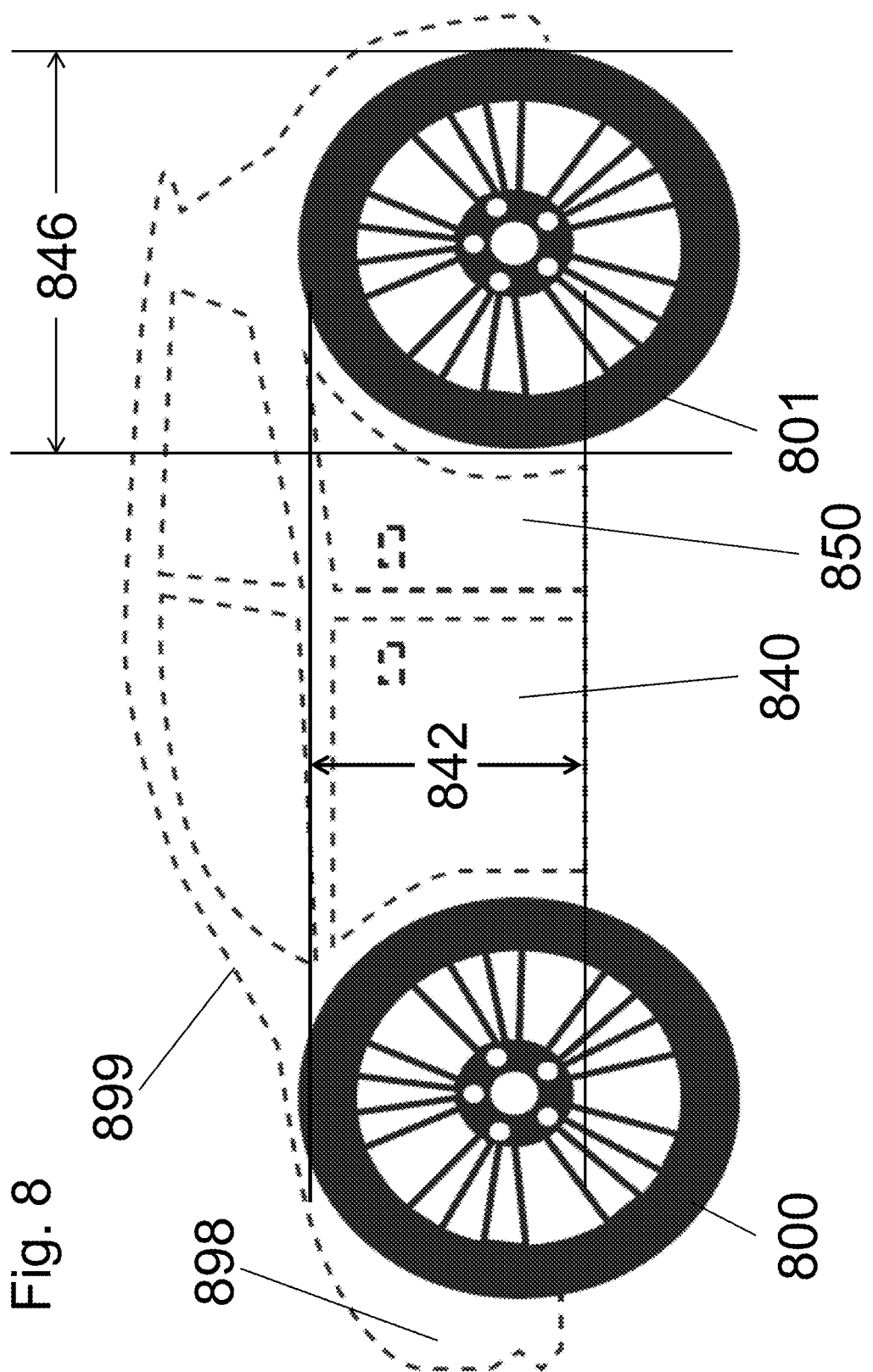
FIG. 8 is an additional exemplary drawing illustration of a left side view of efficient wheels on a vehicle depicting measures.

As illustrated in FIG. 8, a left side view of efficient wheels on a vehicle, may include a front left efficient wheel 800, a rear left efficient wheel 801, front passenger door 840, a rear passenger door 850, and a vehicle 899. Vehicle 899 may also include a vehicle front 898. Front passenger door 840 may have front passenger door height 842, which may be defined as the distance from the front door bottom line to the beginning of the window line. Similarly, rear passenger door 850 may have a rear passenger door height, similarly defined (not shown for drawing clarity). Efficient wheels may have a diameter, for example, rear left efficient wheel 801 may have efficient wheel diameter 846. Efficient wheel diameter 846 may be equal to or greater than the length of the larger of the front or rear door height of a consumer passenger car. For example, efficient wheel diameter 846 may be equal to or greater than front passenger door height 842.

Figure 9:
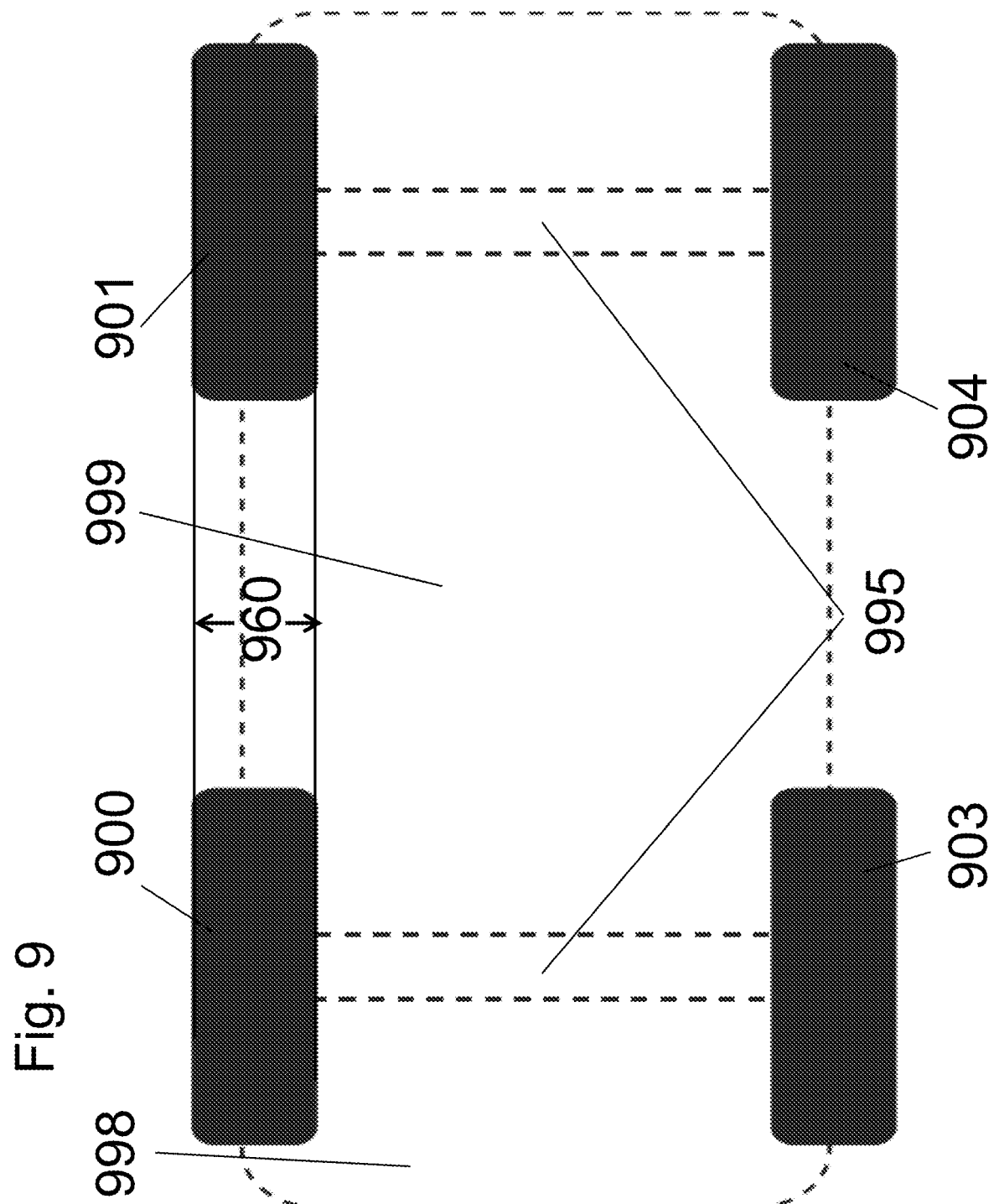
FIG. 9 is an exemplary drawing illustration of a bottom side view of efficient wheels on a vehicle depicting measures.

As illustrated in FIG. 9, a bottom view of efficient wheels on a vehicle, may include a front left efficient wheel 900, a rear left efficient wheel 901, a front right efficient wheel 903, a rear right efficient wheel 904, and a vehicle 999. Vehicle 999 may also include a vehicle front 998 and wheel axles 995. Efficient wheels may have a width, for example, front left efficient wheel 900 and rear left efficient wheel 901 may have wheel width 960. Efficient wheels may have a wheel width larger than about 12 cm, or about 13 cm, or about 14 cm, or about 15 cm, or about 16 cm. For example, wheel width 960 may be greater than about 12 cm, or about 13 cm, or about 14 cm, or about 15 cm, or about 16 cm.

As illustrated in FIG. 10, a left side view of efficient wheels on a vehicle, may include a front left efficient wheel 1000, a rear left efficient wheel 1001, front passenger door 1040, a rear passenger door 1050, and a vehicle 1099. Vehicle 1099 may also include a vehicle front 1098. Efficient wheels may have a diameter, for example, rear left efficient wheel 1001 may have efficient wheel diameter 1046. Fenders may have a wheel cover spacing 1062, which may be defined as the distance from the top of the wheel, for example front left efficient wheel 1000, to the bottom of the associated fender/wheel cover car body at the very top of the wheel. Similarly, wheel cover spacing 1062 may be defined utilizing the rear wheel(s) and the rear fender(s) (not shown for drawing clarity). Wheel cover spacing may be smaller than about 15%, or smaller than about 20%, or smaller than about 25%, or smaller than about 10% of the efficient wheel diameter. For example, wheel cover spacing 1062 may be smaller than about 15%, or smaller than about 20%, or smaller than about 25%, or smaller than about 10% of efficient wheel diameter 1046.

Another aspect of such a large wheeled car relates to steering alternatives. The most common car steering is achieved by steering the wheels forming an angle between the front wheel direction and the remainder of the car; the car and the back wheel direction. For a large wheel (efficient wheel) as has been described herein this would require a large space 'under the hood'. An inventive embodiment herein is to provide for a different speed between the wheels to steer the car. Similar techniques are used with tanks and some other heavy equipment. In many electric cars there are multiple drive motors and in some cases those drive motors may be embedded in the wheel. In such a car the differential car steering could be done by electrical control saving the need for steering mechanics. Such could reduce mechanics parts, car weight, and increase car steering capability especially at very low speed when one wheel could be held substantially still or close to still, and only the other wheel is rotating achieving extremely small turning radius. The other wheel could be on the same axle, or may be on a different axle than the held wheel.

Additional alternative is to use mechanical Differential Steering. Differential gearing is common in cars to accommodate the different turning speeds of each wheel while the car is turning. This type of mechanical differential gearing could also be used to achieve steering by applying control so that one wheel is forced to turn at a different speed than the other wheel; the other wheel is usually the complementary wheel on the same axle or virtual axle, but not necessarily so. Mechanical differential speed for steering could include an electronic and computer control and the use of braking to achieve steering of the car without the conventional steering, or combined with a limited (about 2°, or less than about 5°, or less than about 10° degrees) use of conventional mechanical steering.

Another alternative relates to the wheel profile. Conventional cars, for example such as consumer passenger cars, may use wheels with a very simple profile as is illustrated in FIG. 11A, which is a view of the bottom of the car. Conventionally profiled wheels 1101 may have a substantially rectangular profile when viewed from below, and car 1199 may include 4 conventionally profiled wheels 1101.

For a very large wheel an alternative is to use a shape profile as illustrated in FIG. 11B, which is a view from the bottom of the car. Such wheels could be lighter yet with very good road grabbing and lower sticking. Novel profiled wheels 1103 may have a substantially novel profile when viewed from below, and car 1199 may include 4 novel profiled wheels 1103. Alternatively, car 1199 may include a combination of conventionally and novel profiled wheels (not shown).

Figure 12A:
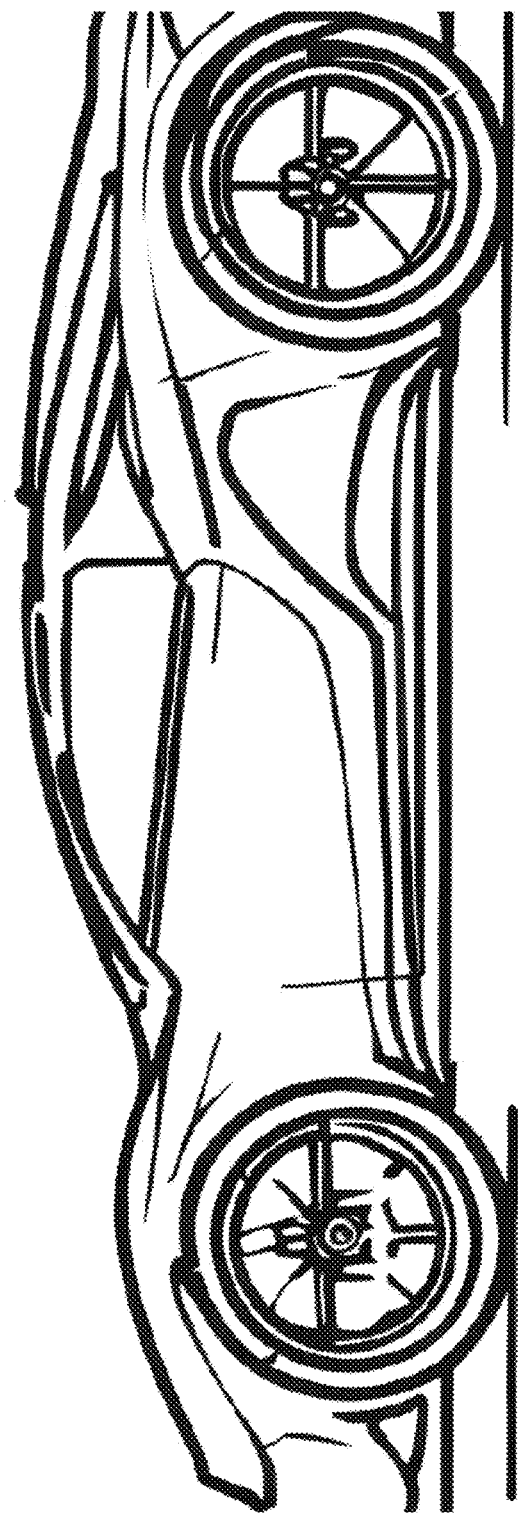
FIG. 12A is an exemplary drawing illustration of a side view of wheels on a vehicle.
Figure 12B:
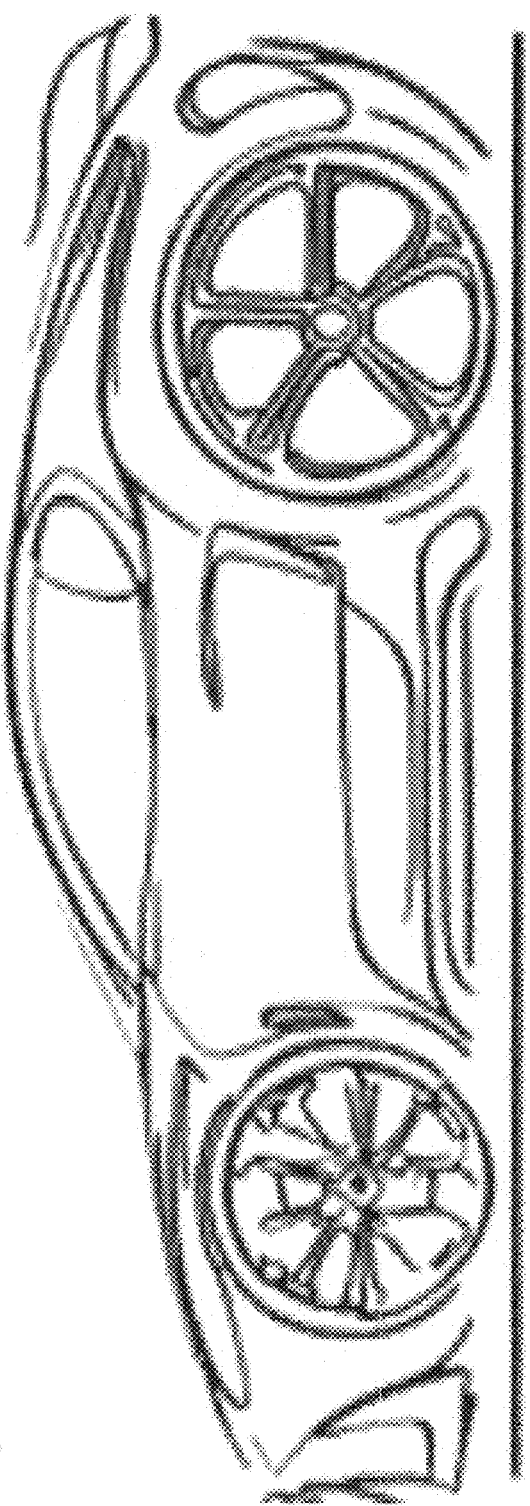
FIGS. 12B-12C are additional exemplary drawing illustrations of a side view of efficient wheels on a vehicle.

FIG. 12A illustrates a conventional sports car with all wheels having substantially the same size. Another alternative is to have the front wheel and the back wheel different sizes as illustrated in FIG. 12B, which shows the exemplary car fitted with large wheels and uneven sizes. Some cars may have the weight unevenly spread between the front wheel and the back; thus, it could be preferred to have a very large wheel for the heavy side and smaller wheels for the lighter side. Such a larger wheel could have more than about 5% or more than about 10% or more than about 20% larger diameter than the small wheel.

A challenge with asymmetric wheel size, such as is illustrated in FIG. 12B, could relate to vehicle stability. The advantage of asymmetric wheels is greater with the asymmetric center of gravity of the vehicle in which the greater portion of the vehicle weight is over the larger wheel. While it could provide better travel distance it could have concerns of vehicle stability and of acceptable traction, good vehicle 'holding' of the road, which may be influenced by shock absorbers, etc.

Figure 12C:
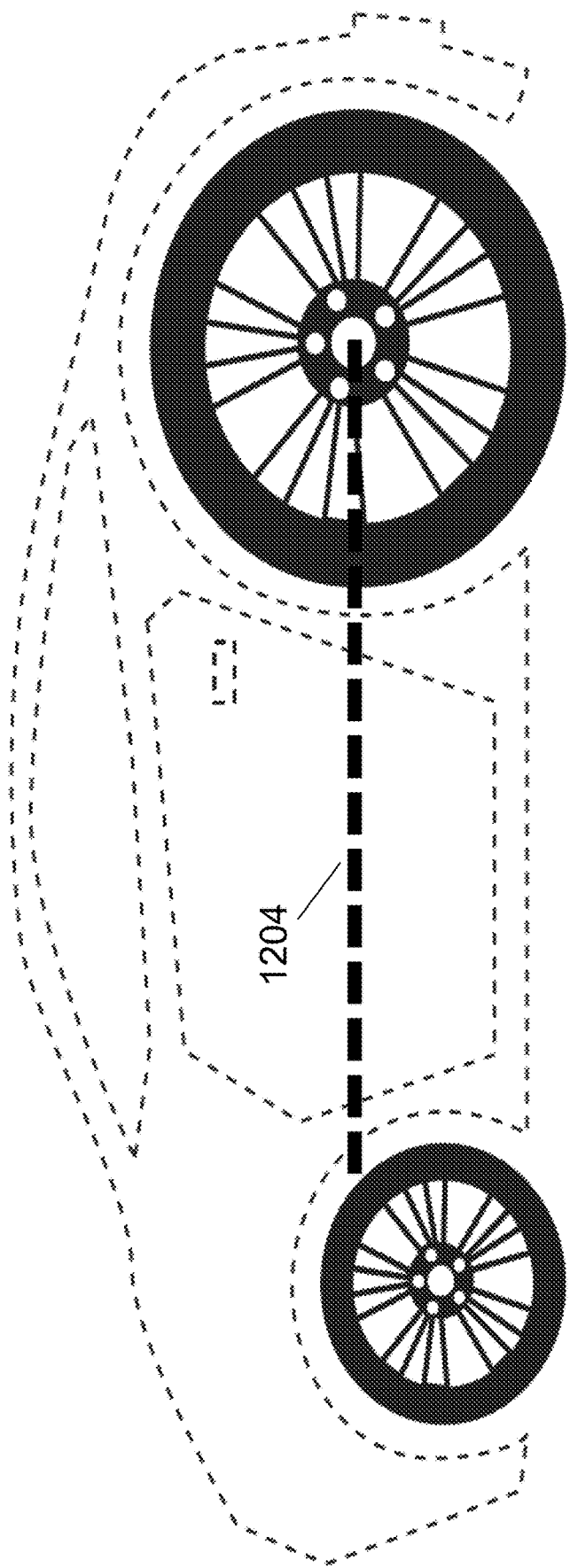

FIG. 12C illustrates a car with far larger back wheels than the front wheel. For the purpose here the car could designed so more than 60% or more than 70% or even more than 80% of the car's weight loaded on these large back wheels. Such an arrangement could challenge the car's stability, especially during velocity changes such as acceleration or braking. The car's design could be adjusted accordingly. Line 1204 is a horizontal line drawn through the center point of the large back wheel—its axial. Accordingly the car's center of gravity could be designed to be around that line 1204 somewhere closer to the back wheel but yet between the front wheels and the back wheels. It could be designed to account for the expected variation associated with having passengers and other loads. In an electric car the battery pack is a significant portion of the overall car weight. Such could make the position of the car center gravity as the battery pack position within the car is relatively less constricted than some of the other elements. The battery pack could be mounted such that it could be moved, for example by motors, forward or backward in the car frame so to adjust the center of gravity according to the needs of the driver and the car.

It should be noted that most passenger cars have relatively moderate sized wheels of less than about 27 inch (diameter). Vehicles having larger than 30 inch wheels are generally designed to serve also on non-paved roads. For example, such as SUVs, Jeeps or large heavy weight vehicles, for example with tracks rather than wheels. It is common that a large wheel size (diameters) comes with wider wheels such as wider than about 8.5 inches. The special large wheel for the high efficiency electric car as presented herein could use a far narrower and lighter wheel such as less than about 8 inches, or less than about 7 inches, or less than about 6 inches, wide as the large wheel is not designed-in to address heavier loads or rough driving terrain, but rather the improvement of the battery for the increased driving distance objective. Such narrower wheels could be lighter and provide comparable road traction (for example, as comparable square inches of tire 'tread' on the road at any given instant). Accordingly in such cases of asymmetric wheel sizes, the larger wheel could be as wide as the smaller wheel or even narrower.

An additional feature which could be added to support such an asymmetric wheeled car is traction control for the smaller wheels. Car users could load the car in such a way that distorts the center of gravity substantially beyond the design target. The car could include sensors to measure the strain on the smaller wheels and actively monitor the strain to avoid the car loosing too much of the smaller wheel road traction. As one of the objectives of having asymmetric wheel size is to allow the small wheels to act as the steering wheels with relatively less impact on the car design associated with the room for such steering. Controlling the wheel's traction is critical to maintain control of the car steering. The control system could prevent too strong a velocity change to prevent such a traction loss.

Accordingly improvements to help manage such concerns could be:
  A. Electronic drive control to allocate more of the driving force to the smaller wheels.
  B. To have a dynamic control of the vehicle center of gravity such as the ability to move a significant weight of the car, for example, more than about 5%, more than about 10%, more than about 15%, more than about 20%, or more than about 25% of the car's total weight, for example, such as the weight of the battery pack, towards the smaller wheels once the control system senses the load on those wheels has gone below a set threshold.
  C. Providing an 'extra axle' [with wheel(s)] momentarily in contact with the ground as the stability control computer detects a need for a stability adjustment. The 'extra axle' would preferably have two small wheels (one could also be useful, but alignment with the car's velocity vector direction perfectly may be difficult under all road conditions) which are spinning at the same ratio adjusted rate as the, for example, large back (or small front), or at a slightly higher rate, via an electric motor, and are momentarily extended to touch the ground. This extension could be done electronically for fast time control and/or hydraulically for overdrive force to monetarily unload the closest main axle and slightly overload the farthest away main axle. The force, contact time, and over-driving length (into the ground) could be computer controlled. Sensors mounted underneath the car could give precise road conditions (divots, bumps, wet, dry, etc.) to the control computer and aid in the computation. Placement would preferably behind the back large wheel axle, past the wheel contact area, and/or forward of the front wheel axle or contact area. Similar and yet smaller effects, but in a different vector, could be supplied by momentary extension of flaps which could be integrated or mounted on the forward and rear fenders. CG adjustments could also be made via short bursts of a gas (for example, air) or liquid (for example water, which could come from rainwater collection, hydrogen fuel cell cars, etc.). These 'jets' could be pointed down towards the ground, or up from the topside of the car (but is rather in-esthetic). They may be placed near the axles or further backwards from the rear axle and further forward from the front axle, for leverage around the point of rotation generating a torque.

On-the-fly-CG adjustments could also be made via permanent and electro-magnets. Preferably on each axle, at least one point, preferably two, a permanent magnet could be installed on the topside of the axle and an electromagnet installed on the frame just directly vertically above the permanent magnet. Ride adjustments could be made by energizing the electromagnet to make it either attractive (opposite polarity: N-S, S-N) or repulsive (same polarity: N-N, S-S). Due to engineering, physics, and design choices, magnet placements could be further back or forward of the rear axle or front axle respectively.

Additional advantage for car with asymmetric wheels is utilizing a smart torque control. For example a car having front wheel(s) having a first size and the back wheel(s) of far larger size and in which the front wheels are powered by first motor and the back wheels with a second motor. Such an equipped car could use a smart control to deliver the torque power to the proper set of wheels. For example, at low speed the smaller wheels could be the ones used first to accelerate while at high speed the larger wheels could be powered to maintain the driving cruise speed. The relationship between speed, torque, and power in DC motors is discussed in a paper by Page, Matt, "Understanding DC Motor Characteristics." *Center for Innovation in Product Development, MIT* (1999); and by Huynh, Thanh Anh, and Min-Fu Hsieh, "Performance analysis of permanent magnet motors for electric vehicles (EV) traction considering driving cycles." *Energies* 11.6 (2018): 1385. In addition, work analyzing use of two different electric motors for front and back is presented in an article entitled "EV design—electric motors" posted at: https://x-engineer.org/automotive-engineering/vehicle/electric-vehicles/ev-design-electric-motors/, the two papers and one article herein above are incorporated herein by reference. The smart control could be managed to optimize for battery use, speed response & handling, and/or driver driving experience.

Figure 13:
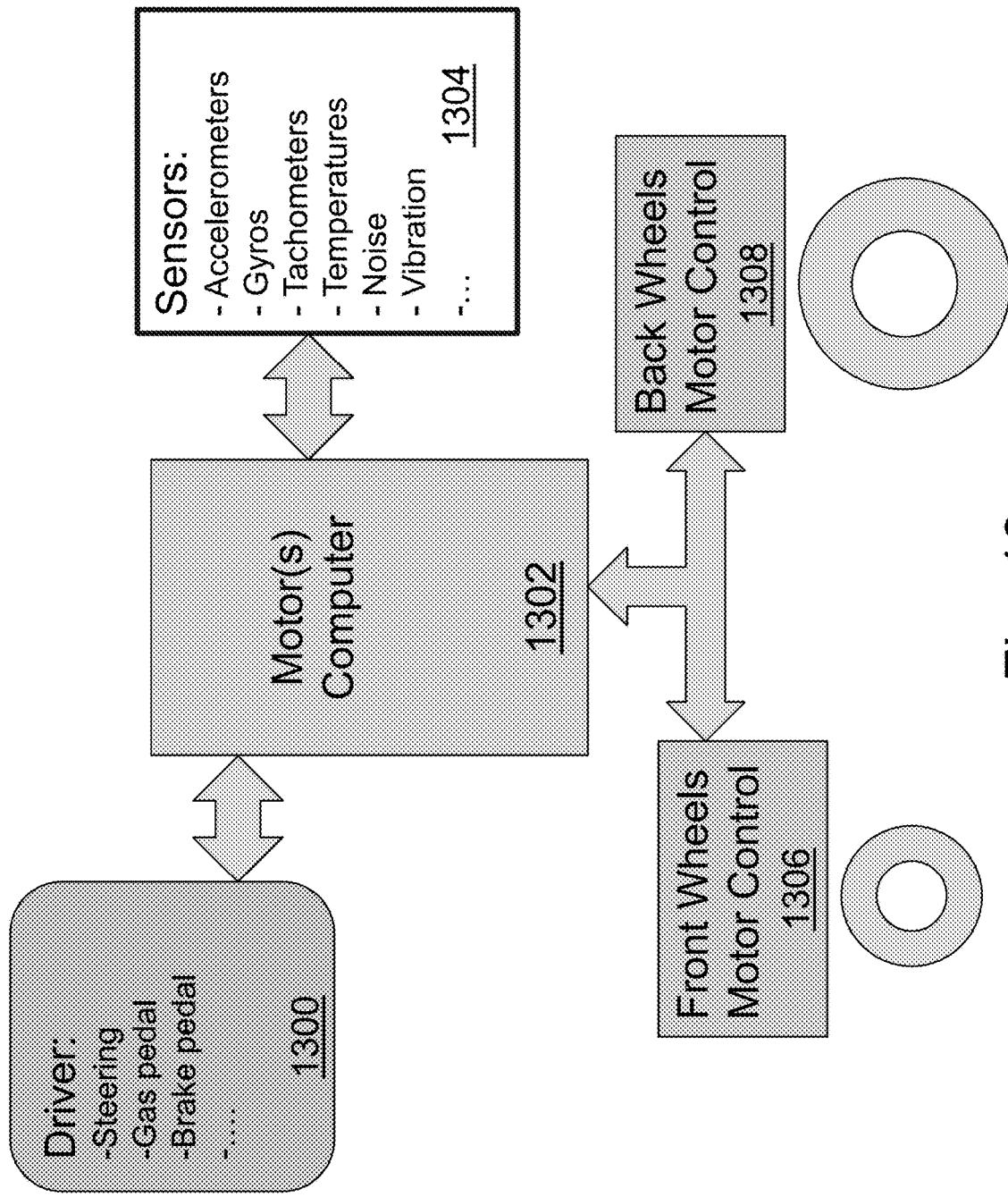
FIG. 13 is an exemplary drawing illustration of a general block diagram for a car control system.

An additional use of such an asymmetric system is for improving regenerative braking efficiency and stability; for example, at high speeds braking with the large wheels may be first but then at lower speeds the small wheels are activated to keep the re-charging efficient. As illustrated in FIG. 13, a general block diagram for such a car control system could have in its core at least one motor(s) computer 1302. Motor(s) Computer 1302 may also comprise multiple computers, each controlling for example, each wheel or portions of each wheel motor's dynamic and static aspects, or it may comprise one computer controlling all aspects of controlling a wheel motor and perhaps other features, such as traction control, etc., or motor(s) computer 1302 may control all four wheel motors, and so on. There may be a backup motor(s) computer as well. It is controlled by the driver commands 1300 and it could have many sensors 1304 to provide data to be used in its computing process for smart motors control and safety levels/interlocks. Motor(s) computer 1302 may return data or haptic feature data to the driver commands 1300. And accordingly interact with the front wheel motors control 1306 and the back wheels motor control 1308. The Wheels Motor Controls (1306/1308) may control motors which may be on each axle (as shown) or on each wheel (not shown).

An additional inventive embodiment is to combine electronic steering (by different wheel rotation of one side vs. the other side) with a limited mechanical steering. As the challenge with front wheels which are twice large as a common wheel is that the mechanical steering of such a large wheel would likely require an excessive amount of mechanism clearance for such large wheel steering. Limiting the mechanical steering to a much smaller maximum steering degree of freedom, or angle with respect to straight travel, for example, such as more than 1° (degree) but less than 2°, or less than 5°, or less than 10°. Complementing mechanical steering, with or without limited max angle freedom, with electronic steering could provide an advantage compared to only mechanical steering or only electronic steering. Such a hybrid electro-mechanical steering system could provide an acceptable control of the vehicle steering when using the asymmetric wheel size, or even with symmetric wheel sizes.

In an article titled "Bonkers patent wants to put super-sized wheels on electric cars" published at https://driving.ca/ on Feb. 4, 2019, author Simon Cohen of "Driving" (part of Postmedia Network Inc., 365 Bloor St East, Toronto, ON, M4W3L4; www.postmedia.com) writes: "Larger wheels are theoretically more efficient, especially at highway speeds. But only if you can compensate for their increased weight, and increased rolling resistance due to their proportionately wider stance, and greater contact area with the road." Such compensation could be achieved by:

A. Utilizing a narrow wheel profile with a waving pattern as presented herein in respect to at least FIG. 11B.
B. Reducing the wheel width in proportion to the larger contact area along the direction of the vehicle motion keeping the overall contact about the same. The common ratio of wheel width to its overall height for passenger cars designed to operate on a paved road is about 1 to 3. Reducing the relative wheel width could be such that the width to overall wheel height (its diameter) is such that the aspect ratio would be smaller than 1 to 4 or even smaller than 1 to 5.
C. Reduce the wheel width even further and accordingly reduce the overall wheel road contact. Such reduction could increase the risk of skidding due to the reduced road contact. To compensate for such increased risk of skidding, an electronic skid control could be added to the electronic wheel drive control to have electronic skidding reduction such as is common for braking and known as anti-lock braking system (ABS). ABS control could be gently introduced at an earlier stage of friction loss and provide a confident feel of vehicle control to the driver. As well, skid control could be improved by utilizing the on-the-fly-CG adjustments described above, especially the deployment of one or more control wheels which could have a computer control steering capability added to the deployable system.

The electronic skid control could allow reduction of wheel width which would reduce wheel weight and rolling resistance and accordingly improving the overall energy efficiency of the car. Such skidding control systems have been presented in at least U.S. Pat. Nos. 4,967,865, 4,992, 945, 5,195,037, 6,151,546, 6,691,015, 8,930,097, 10,029, 679, and 10,252,720, all incorporated herein by reference.

Electric cars using electric motors could benefit from the unique aspect of electric motors. To illustrate some of these aspects we reference the commercial electric motor information provided on the site of NetGain Motors, Inc. The motor graph of FIG. 14A and table of FIG. 14B are provided in reference to their motor HyPer 9 IS 100V, 750 A AC Motor. This is just one example as there are many motors and each could have a different graph and related table. One of the advantages of an electric motor is the ability to provide constant torque from zero speed up to a few thousand Revolutions per Minute ("RPM") as is illustrated in curve 1406 of FIG. 14A. Such motor performance could help reduce the need for a gear box commonly used with gas engine cars. Reducing the need for a gear box further improves the car energy efficiency and reliability.

Having at least one motor for the front smaller wheels and one motor for the back wheels could allow a multiple motors control strategy to be employed for better car performance.

Looking at the efficiency curve 1404 it is clear that the efficiency, as is indicated by the right side scale 1402 and the corresponding column of FIG. 14B table, of electric motors at low RPM, such as less than 1000 RPM, is lower and accordingly using the motor of the smaller wheel could be preferred at such phase so it reaches the high efficiency of about 90% sooner.

Looking at the efficiency curve 1404 that at very high RPM there is some efficiency loss which could be accommodated by shifting the power at high speed to the large wheel that should have a relatively lower RPM. This could supply additional energy savings, which could be considered an unexpected result of combining at least the innovations of larger wheel sizes and more than one electric motor in the vehicle. This could apply to trucks, tractors, etc., not just passenger cars.

An additional inventive embodiment is to utilize two types of electric motors. One type is the permanent magnet motor, which uses permanent magnets on the rotor, which create a synchronous rotation with the alternating current (AC) applied to the stator. And a second type, the induction motor, which uses electromagnetic induction to create a rotating magnetic field on the rotor, which causes a slip between the rotor and the stator.

Some pros of permanent magnet motors are:

They have a higher efficiency than induction motors, especially at higher frequencies.

They have a higher power density and torque density than induction motors, which means they can produce more power and torque with less weight and size[2].

They have better thermal performance than induction motors, because they generate less heat and can operate at higher temperatures.

Some cons of permanent magnet motors are:

They are more expensive than induction motors, because they use rare-earth materials for the magnets.

They are more sensitive to demagnetization and corrosion, which can reduce their performance and lifespan. And geo politics can affect the supply.

They have higher cogging torque, which is the resistance to rotation caused by the interaction of the magnets and the stator slots. This can result in noise and vibration[2].

Some pros of induction motors are:

They are cheaper than permanent magnet motors, because they do not use rare-earth materials.

They are more robust and durable than permanent magnet motors, because they do not have magnets that can demagnetize or corrode.

They have lower cogging torque than permanent magnet motors, which means they have less noise and vibration.

Some cons of induction motors are:

They have lower efficiency than permanent magnet motors, especially at higher frequencies. This means they consume more energy and generate more heat[2].

They have lower power density and torque density than permanent magnet motors, which means they need more weight and size to produce the same power and torque.

They have poorer thermal performance than permanent magnet motors, because they have higher losses and lower operating temperatures.

An inventive embodiment and thus an attractive option is to utilize permanent magnet motors to drive the smaller wheels and induction motors to drive the larger wheels. A smart motor control could leverage the permanent magnet motors for acceleration for which the smaller wheels are a good fit and when high torque is desired such as in a driving up a steep hill; then leverage the induction motors with the larger wheels for cruising which is a good fit and enjoy the relatively lower noise of the induction motors. Such smart motor allocation could match the pro and con of each motor to provide an optimum overall car performance, cost, ease of drive, durability, and efficiency. Matching different size wheels with various electric motor technologies could provide an overall better EV car.

While these observations are specific to the specific engine a similar strategy could be adapted for the specific car to better utilize the car motors for efficiency or other objectives such as noise reduction and ride smoothness, etc.

It will also be appreciated by persons of ordinary skill in the art that the invention is not limited to what has been particularly shown and described hereinabove. For example, drawings or illustrations may not show details of automobile construction or design for clarity in illustration. Further, combinations and sub-combinations of the various features described hereinabove may be utilized. Rather, the scope of the invention includes both combinations and sub-combinations of the various features described hereinabove as well as modifications and variations which would occur to such skilled persons upon reading the foregoing description.

We claim:

1. An electrical passenger car, the electrical passenger car comprising:
    at least two electrically driven motors;
    motor control electronics,
        wherein said motor control electronics are connected to said at least two electrically driven motors;
    wheels,
        wherein said wheels are connected to said at least two electrically driven motors; and
    sensors,
        wherein said sensors are connected to at least said motor control electronics,
        wherein said wheels comprise a first wheel and a second wheel,
        wherein said second wheel has a radius at least 7% greater than a radius of said first wheel,
        wherein said motor control electronics control said at least two electrically driven motors to provide a greater torque to said first wheel than to said second wheel, and
        wherein said electrical passenger car is designed to be driven on a paved road.

2. The electrical passenger car according to claim 1, wherein said second wheel comprises at least one of rear wheels of said electrical passenger car.

3. The electrical passenger car according to claim 1, wherein said electrical passenger car comprises a center of gravity, and
    wherein a distance from said center of gravity to a road surface is at least 10% longer or at least 10% shorter than said second wheel radius.

4. The electrical passenger car according to claim 1, wherein said motor control electronics are adapted to provide a greater braking and recharging efficiency from said second wheel than from said first wheel.

5. The electrical passenger car according to claim 1, wherein said electrical passenger car is designed to move for a first distance, for the same axial to wheel friction energy loss, said first distance which is greater than a second distance of an electrical passenger car having wheels of a smaller radius would move.

6. The electrical passenger car according to claim 1, wherein said electrical passenger car comprises a center of gravity, and
    wherein a distance from said center of gravity to said second wheel is at least 10% shorter than to said first wheel.

7. The electrical passenger car according to claim 1, further comprising:
    electrical steering,
        wherein said wheels comprise a first front wheel and a second front wheel,
        wherein said electrical steering comprises independently controlling a first speed of said first front wheel and independently controlling a second speed of said second front wheel, and
        wherein during a turn of said electrical passenger car said first speed is not equal to said second speed.

8. An electrical passenger car, the electrical passenger car comprising:
    at least two electrically driven motors;
    motor control electronics,
        wherein said motor control electronics are connected to said at least two electrically driven motors;
    wheels,
        wherein said wheels are connected to said at least two electrically driven motors; and
    sensors,
        wherein said sensors are connected to at least said motor control electronics,
        wherein said wheels comprise a first wheel and a second wheel,
        wherein said second wheel has a radius at least 7% greater than a radius of said first wheel,
        wherein said electrical passenger car is designed to be driven on a paved road,
        wherein during an acceleration of said electrical passenger car, said motor control electronics receive first signals from said sensors,
        wherein said first signals indicate skidding of said first wheel,
        wherein said motor control electronics send second signals to at least one of said at least two electrically driven motors, and
        wherein said second signals comprise instructions to reduce torque for said first wheel and increase torque to said second wheel.

9. The electrical passenger car according to claim 8, wherein said second wheel comprises at least one of rear wheels of said electrical passenger car.

10. The electrical passenger car according to claim 8, wherein said electrical passenger car comprises a center of gravity, and
    wherein a distance from said center of gravity to a road surface is at least 10% longer or at least 10% shorter than said second wheel radius.

11. The electrical passenger car according to claim 8,
wherein said motor control electronics are adapted to provide a greater braking and recharging efficiency from said second wheel than from said first wheel.

12. The electrical passenger car according to claim 8,
wherein said electrical passenger car is designed to move for a first distance, for the same axial to wheel friction energy loss, said first distance which is greater than a second distance of an electrical passenger car having wheels of a smaller radius would move.

13. The electrical passenger car according to claim 8,
wherein said electrical passenger car comprises a center of gravity, and
wherein a distance from said center of gravity to said second wheel is at least 10% shorter than to said first wheel.

14. The electrical passenger car according to claim 8, further comprising:
electrical steering,
  wherein said wheels comprise a first front wheel and a second front wheel,
  wherein said electrical steering comprises independently controlling a first speed of said first front wheel and independently controlling a second speed of said second front wheel, and
  wherein during a turn of said electrical passenger car said first speed is not equal to said second speed.

15. An electrical passenger car, the electrical passenger car comprising:
at least one permanent motor and at least one induction motor;
motor control electronics,
  wherein said motor control electronics are connected to said at least one permanent motor and to said at least one induction motor;
wheels,
  wherein said wheels are connected to said at least one permanent motor and to said at least one induction motor; and
sensors,
  wherein said sensors are connected to at least said motor control electronics,
  wherein said wheels comprise a first wheel and a second wheel,
  wherein said second wheel has a radius at least 7% greater than a radius of said first wheel,
  wherein said motor control electronics control said at least one permanent motor and said at least one induction motor to provide a greater torque to said first wheel than to said second wheel, and
  wherein said electrical passenger car is designed to be driven on a paved road.

16. The electrical passenger car according to claim 15,
wherein said second wheel comprises at least one of rear wheels of said electrical passenger car.

17. The electrical passenger car according to claim 15,
wherein said electrical passenger car comprises a center of gravity, and
wherein a distance from said center of gravity to a road surface is at least 10% longer or at least 10% shorter than said second wheel radius.

18. The electrical passenger car according to claim 15,
wherein said motor control electronics are adapted to provide a greater braking and recharging efficiency from said second wheel than from said first wheel.

19. The electrical passenger car according to claim 15,
wherein said electrical passenger car is designed to move for a first distance, for the same axial to wheel friction energy loss, said first distance which is greater than a second distance of an electrical passenger car having wheels of a smaller radius would move.

20. The electrical passenger car according to claim 15,
wherein said electrical passenger car comprises a center of gravity, and
wherein a distance from said center of gravity to said second wheel is at least 10% shorter than to said first wheel.

* * * * *